(12) United States Patent
Brigger et al.

(10) Patent No.: US 12,515,267 B2
(45) Date of Patent: Jan. 6, 2026

(54) SAW BLADE, SAW BLADE BLANK, CARRIER PART BLANK AND METHOD FOR PRODUCING A SAW BLADE

(71) Applicant: Robert Bosch GmbH, Stuttgart (DE)

(72) Inventors: Nathanael Brigger, Grenchen (CH); Samuel Jaccard, Buchs (CH)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 18/249,255

(22) PCT Filed: Aug. 9, 2021

(86) PCT No.: PCT/EP2021/072153
§ 371 (c)(1),
(2) Date: Apr. 16, 2023

(87) PCT Pub. No.: WO2022/083911
PCT Pub. Date: Apr. 28, 2022

(65) Prior Publication Data
US 2023/0390840 A1    Dec. 7, 2023

(30) Foreign Application Priority Data

Oct. 19, 2020 (DE) ..................... 10 2020 213 139.2

(51) Int. Cl.
*B23D 61/12* (2006.01)
*B23D 65/04* (2006.01)

(52) U.S. Cl.
CPC ............ *B23D 61/122* (2013.01); *B23D 65/04* (2013.01); *Y10T 83/935* (2015.04)

(58) Field of Classification Search
CPC ...... B23D 61/023; B23D 61/04; B23D 61/14; B23D 61/122; Y10T 83/9319;
(Continued)

(56) References Cited

U.S. PATENT DOCUMENTS 1,796,864 A * 3/1931 Elmers ................... B23D 61/06
83/841
2,221,735 A * 11/1940 Gommel ............... B23D 61/06
407/47

(Continued)

FOREIGN PATENT DOCUMENTS

DE      82 08 339 U1      8/1982
DE         3712792 A1 * 11/1988  ............ B23D 61/06
(Continued)

OTHER PUBLICATIONS

International Search Report corresponding to PCT Application No. PCT/EP2021/072153, mailed Nov. 8, 2021 (German and English language document) (7 pages).

*Primary Examiner* — Laura M Lee
(74) *Attorney, Agent, or Firm* — Maginot, Moore & Beck LLP

(57) ABSTRACT

A saw blade has at least one carrier part that has at least one cutting side. The saw blade further has a multiplicity of inserts arranged so as to be spaced apart from one another. The inserts are made from a material, in particular a carbide, which is harder than a material of the carrier part. The inserts are each fastened to the at least one cutting side of the carrier part. The inserts each at least partially form at least two saw teeth.

20 Claims, 12 Drawing Sheets

(58) Field of Classification Search
CPC ............. Y10T 83/9326; Y10T 83/9331; Y10T 83/935; Y10T 83/9329
See application file for complete search history.

(56) References Cited

U.S. PATENT DOCUMENTS

| | | | | |
|---|---|---|---|---|
| 2,285,315 | A * | 6/1942 | Thompson | B23D 61/06 83/841 |
| 3,718,799 | A * | 2/1973 | Sawamura | B23K 31/025 219/80 |
| 8,464,622 | B2 * | 6/2013 | Chen | B23D 61/023 83/838 |
| 8,495,942 | B2 * | 7/2013 | Rattunde | B23D 65/00 76/112 |
| 2002/0000150 | A1 * | 1/2002 | Kurelek | B23D 61/04 83/835 |
| 2005/0178264 | A1 * | 8/2005 | Setliff | B23D 61/02 83/835 |
| 2006/0207398 | A1 * | 9/2006 | Nicolson | B23D 61/14 83/13 |
| 2010/0058917 | A1 * | 3/2010 | Scandroglio | B23D 43/06 83/849 |
| 2020/0180054 | A1 * | 6/2020 | Sanogo | B23D 61/122 |

FOREIGN PATENT DOCUMENTS

| | | |
|---|---|---|
| DE | 10 2006 017 815 A1 | 10/2007 |
| DE | 10 2007 016 207 B3 | 7/2008 |
| DE | 10 2011 103 880 A1 | 11/2012 |
| EP | 3 663 027 A1 | 6/2020 |
| FR | 2 905 616 A1 | 3/2008 |
| WO | 2017/085701 A1 | 5/2017 |

* cited by examiner

SAW BLADE, SAW BLADE BLANK, CARRIER PART BLANK AND METHOD FOR PRODUCING A SAW BLADE

This application is a 35 U.S.C. § 371 National Stage Application of PCT/EP2021/072153, filed on Aug. 9, 2021, which claims the benefit of priority to Serial No. DE 10 2020 213 139.2, filed on Oct. 19, 2020 in Germany, the disclosures of which are incorporated herein by reference in their entirety.

BACKGROUND

A saw blade with at least one carrier part, having at least one cutting side and with a plurality of mutually spaced inserts, wherein the inserts are formed from a material having a greater hardness than a material of the carrier part has previously been proposed, wherein the inserts are each fastened to the at least one cutting side of the carrier part.

SUMMARY

The disclosure proceeds from a saw blade with at least one carrier part, having at least one cutting side and with a plurality of mutually spaced inserts, wherein the inserts are formed from a material, in particular carbide, which has a greater hardness than a material of the carrier part, wherein the inserts are each fastened to the at least one cutting side of the carrier part.

It is proposed that the inserts each form, at least partially, in particular at least largely at least two saw teeth.

With the design of the saw blade according to the disclosure, advantageously, a high level of stability and robustness in relation to bending and torsional forces during a sawing operation can be achieved. Advantageously, at the same time, an advantageously small tooth pitch can be enabled. In comparison with saw blades having inserts designed as toothed bars, which each form a plurality of saw teeth, an advantageously high level of stability can be achieved with regard to fractures and with regard to detachment of the inserts during a sawing operation. An advantageously simple and inexpensive forming of saw teeth from the inserts can be enabled, in particular for the production of advantageously small tooth pitches, preferably in comparison with saw blades having inserts which each form a single saw tooth. Advantageously, a high level of flexibility of the saw blade can be ensured. Particularly in the case of saw blades having individual inserts, which each form only one saw tooth, machining and fastening of the inserts with small tooth pitches is made much more difficult. In the saw blade according to the disclosure, small tooth pitches can be enabled with a simultaneously high level of stability of the inserts and a simultaneously high level of flexibility of the saw blade during the sawing operation.

That ""the inserts each form, at least partially, at least two saw teeth"" should in particular be understood to mean that each of the inserts of the saw blade forms the at least two saw teeth at least partially by way of an edge and/or an outer surface of the insert, in particular forms each of the at least two saw teeth partially. The saw teeth are preferably each formed by a flank surface, or in particular also a tooth back, and a cutting surface, or in particular also a tooth face. Preferably, the flank surface and the cutting surface join together in a tooth tip of the saw tooth. In particular, two adjacently arranged saw teeth join together in a tooth bottom which is arranged between the two saw teeth. Preferably, the cutting surface and the flank surface of a saw tooth each transition outwardly into a tooth bottom. Of the at least two saw teeth, preferably, at least a part of a cutting surface and/or a part of a flank surface is formed by one of the inserts, wherein in particular the part of the cutting surface and/or the part of the flank surface is formed from the material of the inserts. Preferably, the inserts each at least partially form not more than 4, preferably not more than 3, and particularly preferably exactly 2 saw teeth. It is also conceivable that the saw blade comprises differently formed inserts, each of which at least partially forms a different number of saw teeth. Preferably, the inserts each at least largely form the at least, in particular exactly, two saw teeth, wherein, in particular each of the at least, in particular exactly, two saw teeth is formed to at least 50%, preferably to at least 60%, and more preferably to at least 70%, of a longitudinal extension of the respective saw tooth by one of the inserts. Preferably, the longitudinal extension of the saw teeth extends at least substantially parallel to a cut edge of the saw blade formed by saw teeth of the saw blade, in particular comprising the at least two saw teeth. A "cut edge" should, in particular be understood to mean an imaginary line that extends substantially along the tips of the saw teeth of the saw blade. Preferably, viewed in at least one projection plane of the saw blade, the cut edge connects the tips of the saw teeth to one another. In particular, the tips of the saw teeth are respectively formed by a line of contact and/or by points of contact of a cutting surface and a flank surface of the saw teeth. Preferably, the cut edge comprises each of the tips of the saw teeth. In particular, the cut edge comprises all the saw teeth arranged along a cutting side of the carrier part. Configurations of the saw blade are conceivable with a rectilinear cut edge, a curved cut edge, or a round cut edge. For example, in a saw blade with a rectilinear cut edge, the cut edge is aligned at least substantially parallel to a main extension direction of the saw blade and/or is comprised by a main extension plane of the saw blade. A "main extension plane" of a component, in particular of the saw blade should in particular be understood as a plane which is parallel to a largest side surface of a smallest imaginary cuboid which just completely encloses the component, and in particular extends through the midpoint of the cuboid. "Substantially parallel" should in particular be understood to mean an orientation of a straight line, a plane or a direction relative to another straight line, another plane or a reference direction, wherein the straight line, the plane or the direction has a deviation relative to the other straight line, the other plane or the reference direction, viewed in particular in a projection plane, which is, in particular less than 8°, advantageously less than 5° and particularly advantageously less than 2°.

Preferably, the saw teeth are each formed, in particular ground, from one of the inserts, in particular an insert blank for producing the inserts, from the carrier part, in particular, a carrier part blank for producing the carrier part and/or the saw blade, and/or from a brazing or weld melt. Preferably, the inserts are connected to the carrier part in an integrally bonded manner. However, it is also conceivable that the inserts are fastened to the carrier part via another, in particular positive-locking and/or a friction-locking connection type. Preferably, the saw blade comprises at least one connection region, in particular a clamping shaft, for fastening the saw blade to a machine tool, in particular, a saw. Preferably, the carrier part forms the connection region or is formed integrally with the connection region. "Integrally" should, in particular be understood as integrally bonded, for example by a welding process or the like, and particularly advantageously formed on or formed, for example by way of the production by a stamping process from a single semi-finished product, for example strip steel. Preferably, the inserts and the carrier part and/or the connection region together form the saw blade. Preferably, the main extension plane of the saw blade is arranged at least substantially parallel to the main extension plane of the carrier part. In one embodiment example, the saw blade is configured and/or the inserts are arranged such that the cut edge is at least substantially formed rectilinear. Preferably, the inserts are arranged along an imaginary straight line on the carrier part. It is also conceivable that the saw blade, in particular the cut edge, the carrier part and/or the cutting side, is formed in a curved or wave-formed manner wherein, for example, the cut edge has an at least substantially identical basic shape as at least one outer surface of the carrier part, in particular different from the cutting side.

The inserts are preferably formed at least substantially entirely from a carbide. Preferably, the material of the inserts has a temperature resistance of at least 800° C., preferably at least 1000° C., and more preferably at least 1100° C. Preferably, the material of the carrier part is formed as a flexible steel, in particular, a high carbon content steel. For example, the carrier part is formed from a heat-treated carbon steel. Preferably, the carrier part is formed at least in a region of the cutting side, in particular at least substantially completely, from the material, which in particular has a lower hardness than the material of the inserts. A "carrier part" should in particular be understood to be a component of an apparatus, in particular the saw blade, which is provided in an assembled state of the apparatus as a carrier for at least one other component of the apparatus, in particular, for inserts forming the saw teeth, in particular to support, hold, and/or move the other component. The term "provided" should in particular, be understood to mean specifically designed, and/or specifically equipped. An object being provided for a particular function should in particular, be understood to mean that the object fulfills and/or performs this particular function in at least one application state and/or operating state. Preferably, the carrier part is configured as a base body of the saw blade. Preferably, the carrier part is provided to transfer an output force of a machine tool driving the saw blade, in particular in the form of a lifting movement or oscillating movement, to the inserts, in particular in a sawing operation. Preferably, the saw teeth and/or a tooth profile formed by the saw teeth, in particular in some regions, are formed from the material of the inserts and the material of the carrier part. Preferably, the saw teeth are each formed at least in the region of a tooth tip of the saw teeth from the material of the inserts. In particular, the saw teeth are each only formed, preferably only partially, from the material of the carrier part in a region of a flank surface of the respective saw tooth.

Preferably, the saw blade, in particular the saw teeth of the saw blade, has a clearance. For example, the saw teeth are configured to be cross-set, wherein in particular the saw teeth and/or the inserts along the cut edge are respectively arranged, in particular alternately in different directions, inclined relative to the main extension plane of the saw blade and/or the cut edge. Alternatively or additionally, it is conceivable for the saw teeth to have an undulation, which in particular forms the clearance. Alternatively or additionally, it is conceivable for the saw teeth to have a clearance angle grind and/or for the inserts, in particular in the area of the cut edge, to project perpendicularly to the main extension plane of the saw blade and/or the carrier part, when viewed over the carrier part. For example, the inserts, viewed along the main extension plane of the saw blade, in particular the carrier part, each have a shape that is at least substantially trapezoidal, wherein in particular a longest basic side of the shape of the inserts is arranged on a side facing away from the carrier part and/or forming the cut edge. Preferably, the inserts, viewed along a main extension plane of the saw blade, in particular the carrier part, each have a maximum width that is greater than a maximum width of the carrier part. Preferably, the width of the inserts and the width of the carrier part are arranged perpendicularly to the main extension plane of the saw blade, in particular the carrier part, and/or to the cut edge. In particular, the maximum width of the inserts is at least 0.5 mm, in particular sometimes also at least 0.8 mm or at least 1 mm, and/or not more than 5 mm, preferably not more than 4 mm, and more preferably not more than 3 mm. Preferably, the saw teeth and/or the inserts each have a tooth shape from a plurality of tooth shapes known to a person skilled in the art, wherein the saw teeth and/or the inserts are each configured, for example, as alternating teeth, as flat teeth, as hollow teeth, as trapezoidal flat teeth, as trapezoidal-trapezoidal teeth and/or as flat teeth with protective bevels or the like. Preferably, the saw teeth are ground or milled from the carrier part and the inserts. Preferably, the saw teeth of the saw blade are each configured as wolf teeth, arched teeth, or pointed teeth. However, other types of teeth known to those skilled in the art are conceivable. Preferably, all the saw teeth and/or all the inserts of the saw blade are formed at least substantially identically. However, it is also conceivable that the inserts, in particular, each, form different types of teeth. For example, it is conceivable that the saw blade comprises intermediate teeth, which in particular are formed at least partially by the inserts.

A "cutting side" should in particular, be understood to mean a side of the carrier part which faces toward the at least one cut edge of the saw blade and/or on which the inserts forming the cut edge are arranged. Alternatively, it is conceivable that the saw blade comprises more than one cutting edge, cut edge and/or more than one tooth profile, wherein the carrier part can comprise more than one cutting side. Preferably, the cut edges and/or cutting edges of the saw blade are formed and/or arranged spaced from one another and/or arranged, for example on two sides of the saw blade facing away from or arranged opposite one another. Preferably, all the inserts of the saw blade are arranged on a cutting side of the carrier part.

Preferably, all saw teeth of the saw blade disposed on a cutting side of the carrier part are arranged in a continuously formed tooth profile. Preferably, the saw teeth and/or the inserts are arranged at regular spacings relative to one another along the cutting side, the cut edge and/or the cutting edge. Preferably, the inserts are arranged on the at least one cutting side at a consistent spacing from one another. Alternatively, it is conceivable that the inserts and/or the saw teeth are arranged at least, advantageously exactly, at two different spacings from one another, which, in particular, alternate when viewed along the cut edge. Preferably, two saw teeth, formed at least partially from a single insert, have a spacing, in particular, from tip to tip, which preferably corresponds to a spacing of one of the at least two saw teeth formed at least partially by the insert from a further saw tooth, which is formed at least partially by a further insert arranged on the carrier part adjacent to the insert. Alternatively, it is conceivable that the spacings of the saw teeth of the individual inserts, individually or in groups, differ from a spacing from saw teeth of an adjacent insert or an adjacent group of inserts. In a preferred configuration of the saw blade, the inserts along the at least one cutting side each have a minimum spacing relative to one another of not more than 2 mm, preferably not more than 1 mm, and more preferably not more than 0.7 mm. Preferably, the minimum spacing between the inserts is at least 0.2 mm, preferably at least 0.4 mm, and more preferably at least 0.5 mm in each case. Preferably, the saw blade has a maximum height between the cut edge and a saw blade back of the saw blade, which is in particular, oriented at least substantially perpendicularly to the cut edge and at least substantially parallel to or at least substantially within the main extension plane of the saw blade. The expression "substantially perpendicularly" is intended, in particular, to mean an orientation of a straight line, a plane or a direction relative to another straight line, another plane or a reference direction, wherein in particular viewed in a projection plane, the straight line, the plane or the direction and the other straight line, the other plane or the reference direction enclose an angle of 90° and the angle has a maximum deviation of in particular, less than 8°, advantageously less than 5° and particularly advantageously less than 2°. Preferably, a ratio of the maximum height of the saw blade to a maximum height of the individual inserts, which in particular at a position of the respective insert on the carrier part, is oriented at least substantially perpendicularly to the cut edge and at least substantially parallel to or at least substantially within the main extension plane of the saw blade, is at least 3, preferably 5 to 10, but sometimes more than 15, for example, 20 to 50. Preferably, the saw blade has at least a total cutting length. A "total cutting length" should in particular, be understood to mean a maximum length of a cut edge of a tooth profile, which in particular, extends along the cut edge. In particular, a ratio of a total cutting length of the saw blade to a maximum length of the individual inserts oriented at least substantially parallel to the cut edge is at least 10, preferably 20 to 40, sometimes also more than 50 or more than 70. Particularly in a rectilinear or circular configuration of the cut edge, the inserts are preferably arranged on a single imaginary plane, which is oriented at least substantially perpendicularly to the main extension axis of the saw blade and/or the carrier part. As an alternative to a regular arrangement of the inserts on the carrier part, it is conceivable that the inserts are arranged irregularly on the carrier part, for example in the form of a vario-toothing.

Preferably, the saw blade is provided for use with a jigsaw, a reciprocating saw, a hole saw, or an oscillating multi-function machine tool. Preferably, the saw blade is provided for a sawing operation along a linear drive axis or about a drive axis. Preferably, the saw blade is provided with the inserts for cutting particularly hard materials, for example high strength steels or abrasive materials. For example, the saw blade comprises at least 20 saw teeth, preferably at least 50 saw teeth, and more preferably at least 70 saw teeth, which in particular, form a continuous tooth profile and/or are arranged along a single cutting edge and/or cut edge of the saw blade. Preferably, the saw blade is formed free of a chip guiding step. However, configurations with a chip guiding step are also conceivable.

Furthermore, it is proposed that the inserts each at least partially form at least two cutting surfaces and at least two flank surfaces of the saw teeth. An advantageous configuration of the saw teeth can be enabled by the inserts, in particular with regard to an advantageously high level of stability with a simultaneously advantageously small tooth pitch of the saw blade. Preferably, the inserts each at least partially form exactly two saw teeth, wherein in particular the two flank surfaces and the two cutting surfaces are formed as part of the two saw teeth. Preferably, the inserts each form tooth tips of the at least two saw teeth. Preferably, the inserts each at least substantially completely form a cutting surface of a saw tooth and a flank surface of a further saw tooth, which, in particular viewed at least substantially perpendicularly to the at least one cut edge, are arranged adjacent to one another. Preferably, the inserts each form a cutting surface of the further saw tooth and a flank surface of the saw tooth at least partially, in particular, at least largely. Preferably, the inserts each form the saw tooth and the further saw tooth at least largely, in particular with respect to a material forming the at least two saw teeth and/or with respect to a length parallel to the cut edge formed by the two saw teeth. Preferably, the at least two saw teeth formed at least partially by an insert, have a spacing, in particular from tip to tip, of not more than 3 mm, preferably not more than 2 mm, and more preferably 1 mm to 1.8 mm. Preferably, all the saw teeth of the saw blade have a spacing that is at least substantially identical, one to the next from tip to tip, which is in particular not more than 3 mm, preferably not more than 2 mm, and more preferably 1 mm to 1.8 mm.

It is further proposed that the inserts each form at least two cutting surfaces of the saw teeth completely, preferably also at least one flank surface, in particular the at least two flank surfaces, completely, and at least partially form another flank surface, in particular, the at least two flank surfaces. An advantageous configuration of the saw teeth can be enabled by the inserts, in particular with regard to an advantageously high level of stability with a simultaneously advantageously small tooth pitch of the saw blade. In particular, the other flank surface of the at least two flank surfaces is formed, viewed along the cut edge, over at least 20%, preferably at least 30%, and more preferably at least 40% of a spacing oriented parallel to the cut edge of the tip bounding the other flank surface and of the tooth bottom bounding the other flank surface by an insert. In particular, the saw teeth are each formed in a region about the tooth bottom bounding the other flank surface by the carrier part and/or the brazing or weld melt.

In addition, it is proposed that the carrier part have, along the at least one cutting side, a plurality of fastening receptacles, wherein the inserts are each connected to the carrier part by way of the fastening receptacles. Advantageously, in particular in addition to the integral bonding, a positive-locking connection between the carrier part and the inserts can be enabled. In this way, an advantageously high level of stability against bending and torsional forces can be enabled, in particular, as compared to saw blades with a flat carrier part. Possible interruptions between the inserts and the carrier part during a sawing operation can advantageously be prevented. By means of inserts embedded in the fastening receptacles, an advantageously high level of stability can be enabled, for example, compared to miter saw blades with a flat cutting side of the carrier part. Preferably, the fastening receptacles are introduced into the carrier part prior to fastening of the inserts on the carrier part. Preferably, the fastening receptacles are configured as cut-outs bounded by the carrier part, wherein in particular the inserts are each arranged at least partially in one of the cut-outs. Preferably, the inserts each, at least largely, preferably completely fill a fastening receptacle, which is, in particular, configured as a cut-out. Preferably, the fastening receptacles on the saw blade are only recognizable by a connection site, in particular a weld seam and/or a material transition, to the carrier part. Alternatively, other configurations of the fastening receptacles are conceivable, for example as locking projections, as positive-locking projections or the like. Preferably, the inserts are arranged and/or fastened to the carrier part such that the saw blade is free from gaps and/or cut-outs when viewed perpendicularly to the main extension plane of the saw blade. Preferably, the fastening receptacles formed as cut-outs bounded by the carrier part are formed at least substantially circular segment-shaped or wedge-shaped, viewed, in particular perpendicularly to the main extension plane of the carrier part and/or the saw blade. In particular, the fastening receptacles, viewed, in particular, perpendicularly to the main extension plane of the carrier part and/or the saw blade, are at least substantially round, in particular, free of corners, independently of a basic shape that is at least substantially circular segment-shaped or wedge-shaped. Preferably, the fastening receptacles each extend over a full thickness of the carrier part and/or the carrier part blank. Preferably, the fastening receptacles are arranged on the cutting side of the carrier part and/or within a region close to the cutting side of the carrier part. Preferably, the cutting side of the carrier part is configured differently from a straight and/or smooth configuration, wherein in particular, the fastening receptacles form regions of the cutting side that deviate from a main extension axis of the cutting side and/or from a circularly arcuate basic shape of the cutting side. Preferably, the fastening receptacles at least partially form the cutting side. A "main extension axis" of an object should in particular, be understood to mean an axis which extends parallel to a longest edge of a smallest geometrical cuboid which just completely encloses the object. Preferably, the main extension axis of the cutting side and/or the circularly arcuate basic shape of the cutting side extends/extend at least substantially parallel to the main extension plane of the saw blade and/or the carrier part. Preferably, the cutting side of the carrier part on the saw blade is at least largely, in particular at least substantially completely covered by the inserts and a brazing or weld melt. In particular, a contour of the cutting side, viewed at least substantially perpendicularly to the main extension plane of the saw blade, is visible on an exterior of the saw blade. Preferably, the fastening receptacles are each provided to receive exactly one insert for a fastening of the insert to the carrier part. Preferably, the carrier part forms exactly one fastening receptacle for each insert of the saw blade. Preferably, the fastening receptacles are arranged at regular intervals on the carrier part, in particular, on the cutting side. Preferably, the inserts, in particular, in a direction oriented at least substantially perpendicularly to the cut edge and at least substantially parallel to the main extension plane of the carrier part, over at least 0.2 mm, preferably at least 0.3 mm, and more preferably at least 0.4 mm, are embedded in the fastening receptacles, in particular, as cut-outs in the cutting side. Alternatively, it is conceivable that the cutting side is configured flat, in particular, free of fastening receptacles, wherein in particular the inserts are fastened to the flat cutting side, preferably by means of a welding method. Preferably, a ratio of a number of saw teeth of the saw blade to a number of fastening receptacles of the carrier part is at least 2, preferably not more than 4, more preferably not more than 3, and most preferably at least substantially 2. Particularly in a configuration in which the inserts each at least partially form exactly 2 saw teeth, the ratio of a number of saw teeth of the saw blade to a number of fastening receptacles of the carrier part is 2. It is conceivable that the carrier part and/or the carrier part blank is/is configured such that the fastening receptacles are arranged directly adjacent to one another along the cutting side and, in particular transition into one another or that along the cutting side, between two of the fastening receptacles, in each case, regions of the carrier part and/or the carrier part blank are free of fastening receptacles. In particular, these regions are configured at least substantially planar and/or are oriented at least substantially parallel to the cut edge. It is conceivable that, especially perpendicularly to the main extension plane of the carrier part and/or the saw blade, a basic shape of the fastening receptacles is changed by a fastening, in particular, welding the inserts or the insert blank on the carrier part and/or the carrier part blank, wherein for example, material of the carrier part and/or the carrier part blank is displaced by an insert and/or an insert blank.

Furthermore, it is proposed that the saw blade comprise a plurality of saw teeth, in particular the aforementioned saw teeth, wherein saw teeth of the plurality of saw teeth, which are arranged at least partially between adjacent inserts, are each formed at least partially by the material of the carrier part and/or by a brazing or weld melt. Advantageously a high level of stability and robustness of the saw blade can be achieved. Weak sites in the saw blade can advantageously be prevented, for example by expansion joints or the like between the inserts. An advantageously high flexibility of the saw blade along a cutting edge of the saw blade can be achieved, in particular since the carrier part, in particular, the material of the carrier part, has a lower stiffness than the material of the inserts.

Preferably, the inserts are welded to the carrier part. Advantageously a high level of stability and robustness of the saw blade, in particular of the connection between the inserts and the carrier part, can be enabled. Unintended damage due to mechanical stress and/or heat influences can advantageously be prevented, in particular as compared to inserts brazed to the carrier part. Advantageously, a development of intermediate spaces through removed brazing metal can be prevented. In particular, the inserts are welded to the carrier part by way of the inner surfaces of the carrier part which are bounded by the fastening receptacles. In addition, it is conceivable that intermediate regions on the carrier part, in particular, on the cutting side, which are arranged between the inserts, are formed at least partially by a weld melt and in particular, at least partially form saw teeth. Preferably, the saw blade is formed free of expansion joints. In a preferred configuration of the saw blade, the carrier part is preferably not enclosed by the inserts. Preferably, the inserts and the carrier part are each arranged next to one another and welded to one another, viewed at least substantially perpendicularly to the main extension plane of the saw blade, along a common contour which, in particular bounds a fastening receptacle. Preferably, in particular dependent upon a number of saw teeth formed at least partially by the individual inserts, every second, third or fourth saw tooth of the plurality of saw teeth is formed at least partially by the material of the carrier part and/or by a brazing or weld melt.

Preferably, sub-regions of saw teeth, in particular tooth bottoms and/or flank surfaces, are formed between the inserts through the carrier part and/or a, in particular the aforementioned, brazing or weld melt. Preferably, in particular dependent upon a number of saw teeth formed at least partially by the individual inserts, viewed along the at least one cut edge and/or the at least one cutting side, every second, every third or every fourth tooth bottom and/or every second, every third or every fourth flank surface is formed at least partially by the carrier part and/or a brazing or weld melt. In particular, in a configuration in which each insert at least partially forms exactly two saw teeth, every second tooth bottom of the saw teeth of the saw blade is formed at least partially by the carrier part and/or a/the brazing or weld melt. In a configuration of the inserts, wherein they each at least partially form two saw teeth, viewed along the at least one cutting edge, the cut edge and/or the at least one cutting side, preferably every second tooth bottom is at least substantially completely formed by the carrier part and/or by a brazing or weld melt. Preferably, the sub-regions of the saw teeth are configured as intermediate regions. Preferably, the sub-regions of the saw teeth are each arranged between two inserts, as viewed in particular perpendicularly to the main extension plane of the carrier part and/or the saw blade. In a configuration of the saw blade, in which the inserts each at least partially form 3 saw teeth, as viewed along the cut edge, each third tooth bottom is preferably formed at least largely, in particular at least substantially completely, by the carrier part and/or by a brazing or weld melt.

It is also proposed that the inserts be mutually spaced by intermediate regions formed by the carrier part, in particular the aforementioned intermediate regions, which are arranged between the inserts, in particular at least substantially perpendicularly to one, in particular the aforementioned, cut edge of the saw blade. Advantageously a high level of flexibility of the saw blade along the cut edge of the saw blade can be achieved. Through the intermediate areas, weak sites in the saw blade can be advantageously prevented, for example by stress expansion joints or the like between the inserts. Preferably, the intermediate regions each at least partially, in particular at least largely, comprise a tooth bottom of the saw teeth and/or a flank surface of a saw tooth. Preferably, the sub-regions of the saw teeth and/or the intermediate regions formed by the carrier part are formed separately from the inserts. Preferably, the sub-regions of the saw teeth and/or the intermediate regions formed by the carrier part together with the inserts form the saw teeth of the saw blade, which are in particular, arranged in a continuous tooth profile. Alternatively, it is conceivable that the saw teeth of the saw blade are arranged in continuously formed groups, wherein a cut-out is bounded between each group of saw teeth, said cut-out being formed, in particular, free of saw teeth.

It is further proposed that the inserts each be formed at least substantially round, in particular circularly arcuate, on a side facing toward the carrier part. A positive-locking connection between the inserts and the carrier part can advantageously be enabled. Advantageously, stable weld sites can be achieved between the carrier part and the individual inserts. Preferably, the inserts are respectively fastened to the carrier part by way of the side facing toward the carrier part, in particular welded to the carrier part. Preferably, the side of each insert that faces toward the carrier part is designed corresponding to a shape of the fastening receptacles of the carrier part. Preferably, the inserts each at least partially form the at least two saw teeth on a side of the inserts facing away from the side formed at least substantially round, in particular, circularly arcuate. In particular, the inserts each have, on a side facing toward the carrier part, a curvature at least in regions with a radius of curvature of at least 1 mm, preferably at least 1.2 mm, and more preferably at least 1.3 mm. For example, the inserts on the side facing toward the carrier part are formed continuously curved, in particular circularly arcuate or elliptical, or only curved at end regions of the inserts arranged along the cut edge.

Furthermore, it is proposed that the saw blade comprise at least one, in particular the aforementioned, cut edge and a tooth density formed along the cut edge of at least 12 TPI, preferably more than 12 TPI, more preferably at least 14 TPI, at least 16 TPI, especially preferably at least 18 TPI or more. Advantageously, a small tooth pitch can be achieved, in particular with a simultaneously advantageously high level of stability and robustness of the saw blade. Preferably, specifically by means of the design of the inserts, which each form the at least two saw teeth, an advantageously high tooth pitch can be enabled with a simultaneously advantageously high level of robustness of the saw blade. In particular, a "tooth density" should also be understood as a tooth pitch, in particular a number of saw teeth per unit length along the cut edge. The tooth pitch preferably extends along or parallel to the cut edge. Preferably, the tooth density of the saw blade is more than 4.72 1/cm, preferably more than 5.51 1/cm, and more preferably more than 6.2 1/cm. Preferably, a maximum length of the individual saw teeth formed along the cut edge is not more than 2.5 mm, preferably not more than 2 mm, and especially preferably not more than 1.6 mm. In particular, a spacing of the saw teeth, in particular tip to tip, at a tooth density of 12 TPI is at least substantially 2.1 mm. In particular, a spacing of the saw teeth, in particular tip to tip, at a tooth density of 14 TPI is at least substantially 1.8 mm. In particular, a spacing of the saw teeth, in particular, tip to tip, at a tooth density of 16 TPI is at least substantially 1.6 mm. In particular, a spacing of the saw teeth, in particular tip to tip, at a density of 18 TPI is at least substantially 1.4 mm. Preferably, the saw blade has a constant tooth pitch, wherein in particular the saw teeth have a uniform tooth pitch, or a variable tooth pitch. With a variable tooth pitch, the saw teeth of the saw blade have multiple different tooth spacings. In particular, in a configuration as a variable tooth pitch, the saw blade has a tooth density, which is averaged in particular over a complete length of the at least one cut edge. Preferably, the inserts are formed by insert blanks which are ground and/or milled to form the saw teeth during a production of the saw blade. Preferably, the inserts each have a greater main extent perpendicularly to the cut edge than parallel to the cut edge. In particular, a maximum length of the individual inserts aligned parallel to the cut edge is at least 1.5 mm, preferably at least 2 mm, and more preferably at least 2.3 mm, and/or not more than 7 mm, preferably not more than 6 mm, and more preferably not more than 5 mm. Preferably, a center point of a spacing extending parallel to the cut edge, of the at least two tooth tips formed by an insert, in particular, the outermost two tooth tips formed by an insert, is arranged offset against a cutting direction of the saw blade to a center point of a maximum length of the insert extending parallel to the cut edge. In particular, the cutting direction of the saw blade is oriented from a cutting surface of one of the saw teeth in the direction towards a flank surface of the respective saw tooth. In particular, an advantageously high level of stability of the saw teeth can be achieved since an advantageously large region of the individual saw teeth can be formed from the material of the inserts in the cutting direction behind a cutting surface of the saw teeth.

In addition, it is proposed that all the saw teeth of the saw blade in each case be formed at least partially, in particular at least largely from one of the inserts, in particular from half as many, one third, or one quarter as many inserts as saw teeth. A tooth profile with an advantageously substantially continuously formed high level of hardness can be enabled, in particular without saw teeth which are formed entirely from a softer material. Advantageously, unwanted damage to the carrier part between the inserts can be prevented. Thereby, a loading of the saw blade acting unequally on the inserts can be advantageously prevented. In particular, all the saw teeth of the saw blade are formed at least partially, in particular at least largely, from the material of the inserts.

Preferably, the saw blade does not have any, in particular, complete, saw teeth that are only formed from the material of the carrier part. Preferably, a minimum spacing of the individual inserts, which in particular is oriented at least substantially parallel to the cut edge, is less than the maximum length of the individual saw teeth. Preferably, the saw blade only comprises saw teeth that are formed at least partially from the material of the inserts, in particular, carbide. In particular, the saw blade does not comprise any saw teeth that are formed entirely from the material of the carrier part. Preferably, a ratio of a number of saw teeth of the saw blade to a number of inserts of the saw blade is at least 2, preferably not more than 4, more preferably not more than 3, and even more preferably at least substantially 2. Particularly in a configuration of the saw blade, in which the inserts each at least partially form exactly 2 saw teeth, the ratio of a number of saw teeth of the saw blade to a number of inserts of the saw blade is 2.

In addition, the disclosure proceeds from a method for producing a saw blade, in particular a saw blade according to the disclosure, wherein, in at least one method step, a plurality of insert blanks are arranged mutually spaced on at least one cutting side of at least one carrier part blank and fastened to the carrier part blank, in particular integrally bonded to the carrier part blank, wherein the insert blanks are made of a material, in particular a carbide, which has a greater hardness than a material of the carrier part blank.

It is proposed that in at least one further method step at least two saw teeth be formed, at least partially, in particular at least largely, on each of the insert blanks.

With the configuration of the method according to the disclosure, an advantageously high level of stability and robustness of the saw blade to bending and torsion forces during a sawing operation can be achieved. Advantageously, at the same time, an advantageously small tooth pitch of the saw blade can be enabled. Compared to saw blades with inserts configured as toothed bars, which each form a plurality of saw teeth, an advantageously high level of stability of the saw blade in relation to fractures and in relation to a detachment of the inserts during a sawing operation can be achieved. An advantageously simple and inexpensive forming of saw teeth from the inserts can be enabled, in particular for the production of advantageously small tooth pitches, preferably in comparison with saw blades having inserts which each form a single saw tooth. Advantageously, a high level of flexibility of the saw blade can be ensured.

In particular, in the further method step, not more than 4, preferably not more than 3 and preferably exactly 2 saw teeth are at least partially, in particular at least largely, formed. Preferably, the saw teeth are formed by means of a grinding method and/or by means of a milling method. In particular, by fastening the insert blanks on the carrier part blank, a saw blade blank is formed. In particular, the saw blade is formed from the saw blade blank by forming the saw teeth on the insert blank, the carrier part blank and/or the brazing or weld melt, which in particular comprises the finished carrier part and the inserts at least partially forming the saw teeth fastened thereto. Preferably, the insert blanks and regions of the carrier part blank disposed between the insert blanks and/or the brazing or weld melt are machined to form the saw teeth, wherein in particular a continuous tooth profile is formed. Preferably, the saw teeth are formed such that the saw teeth of the saw blade are formed by the inserts and the carrier part, in particular intermediate regions of the carrier part, and/or the brazing or weld melt. Particularly preferably, the insert blanks are each machined such that exactly two saw teeth are formed at least partially on each insert blank. Preferably, in at least one method step, in particular, prior to placing and fastening the insert blanks on the carrier part blank, a plurality of, in particular the aforementioned fastening receptacles are introduced into a semi-finished product and/or the carrier part blank, for example by means of a milling process. In particular, the fastening receptacles are formed by way of a material removal on the cutting side of the carrier part blank. Preferably, the fastening receptacles are introduced into the carrier part blank such that they extend over a full width of the carrier part blank. In addition, it is conceivable that in at least one method step, in particular, prior to arranging and fastening the insert blanks on the carrier part blank, a connection region for a fastening of the saw blade to be produced on a machine tool is formed on a semi-finished product and/or the carrier part blank or a connection region is fastened to a semi-finished product and/or the carrier part blank. Alternatively, it is conceivable that the carrier part blank is produced with the fastening receptacles and/or the connection region in a single method step, for example, in a stamping or pressing process, in particular from one piece. Preferably, by forming the saw teeth on the insert blanks, on the carrier part blank, in particular on the intermediate regions, the saw blade, which is made in particular from the carrier part and the inserts, is formed. Preferably, the carrier part blank is formed by introducing the fastening receptacles and introducing and/or fastening the connection region. Preferably, by forming the saw teeth and/or the tooth profile, the inserts are formed from the insert blanks. Preferably, the carrier part is formed by forming the saw teeth and/or the tooth profile from the carrier part blank. Preferably, the insert blanks are joined, in particular welded, to the carrier part blank in an integrally bonded manner in at least one method step. Advantageously a high level of stability and robustness of the saw blade, in particular the connection between the inserts and the carrier part, can thereby be enabled. Unintended damage due to mechanical stress and/or heat influences during a sawing operation of the saw blade can be advantageously prevented, in particular as compared to inserts brazed to the carrier part. Preferably, the insert blanks and the carrier part blank are joined together in an integrally bonded manner by a resistance welding process. Preferably, the saw teeth are formed after the insert blanks have been joined to the carrier part blank in a integrally bonded manner, thereby in particular forming the saw blade. Preferably, the insert blanks and the carrier part blank are each welded directly together, in particular without introducing additional material to the saw blade.

In addition, it is proposed that the saw teeth be formed from the insert blanks and the carrier part blank and/or from the insert blanks and a brazing or weld melt, in particular a weld melt generated by melting the carrier part blank, between the insert blanks. Advantageously a high level of stability and robustness of the saw blade can be achieved. Weak sites in the saw blade can advantageously be prevented, for example by expansion joints along the cutting edge, by an excessively stiff accommodation of the inserts, by a stiff configuration of the saw teeth over an entire length of a toothed bar, wherein, in particular there is a risk of breakage of the toothed bar, or the like between the inserts. An advantageously high flexibility of the saw blade along the cut edge of the saw blade can be achieved, in particular since the carrier part, in particular the material of the carrier part, and/or the brazing or weld melt has a lower stiffness than the material of the inserts. Preferably, the saw teeth are formed such that a transition between the inserts and the carrier part and/or the brazing or weld melt is at least formed substantially flush. "Substantially flush" should be understood to mean a transition between two lines or two surfaces, in particular between the saw teeth-forming outer surfaces of the inserts and the saw teeth-forming outer surfaces of the carrier part and/or the brazing or weld melt, wherein the two lines or the two surfaces in the region of the transition merge continuously into one another.

It is also proposed that the insert blanks which, in particular, prior to forming the saw teeth, each have a basic shape which is, viewed, in particular perpendicularly to the main extension plane of the carrier part blank and/or to a main extension plane of the insert blank, at least substantially round, in particular circular, crescent-shaped, drop-shaped or partially cylindrical, be arranged on and fastened to the carrier part blank, preferably in particular, individually welded, wherein the at least two saw teeth are each formed at least partially from the insert blanks by means of a grinding method, in particular at least the aforementioned two cutting surfaces of each of the at least two saw teeth are fully formed. An advantageously simple and inexpensive forming of the saw teeth can be enabled. An advantageously simple positive-locking insertion of the insert blanks on the carrier part blank can be enabled. Preferably, the insert blanks, in particular prior to a forming the saw teeth, have an at least partially conical and/or trapezoidal basic shape, viewed along the cutting side of the carrier part blank, wherein in particular the saw teeth are formed on a longest basic side of the trapezoidal basic shape. Alternatively, it is conceivable that the insert blanks, in particular, prior to a forming the saw teeth, are each formed cylindrical, wherein in particular the saw teeth are formed on a surface shell-shaped exterior of the insert blanks. Preferably, the insert blanks are machined to form the saw teeth such that the basic shape of the insert blanks is no longer clearly recognizable after forming the saw teeth.

Furthermore, it is proposed that, in at least one method step, in particular, prior to an arrangement of the insert blanks on the carrier part blank, at least one positive-locking cut-out for a positive-locking connection to one of the insert blanks be introduced, in particular stamped, into the carrier part blank, wherein the positive-locking cut-out from the carrier part blank, viewed at least substantially perpendicularly to a main extension plane of the saw blade, in particular the carrier part blank, is at least substantially completely covered. Advantageously, an in particular, additional, positive-locking connection of the insert blanks to the carrier part blank can be achieved. Advantageously, a high level of stability can be achieved in relation to forces acting perpendicularly to a main extension plane of the individual inserts. In particular, the at least one positive-locking cut-out is introduced on the cutting side of the carrier part blank. Preferably, a plurality of positive-locking cut-outs is introduced into the carrier part blank, wherein in particular a number of the positive-locking cut-outs corresponds to a number of the insert blanks to be fastened to the carrier part blank, in particular for producing the saw blade. Preferably, in an arrangement on the carrier part blank, in particular, in a direction extending within the main extension plane of the carrier part blank, the insert blanks are at least partially inserted into a positive-locking cut-out. Preferably, the insert blanks are each connected to the carrier part blank in an integrally bonding manner after being inserted into one of the positive-locking cut-outs. In particular, the insert blanks are arranged and/or fastened individually, in particular sequentially, to the carrier part blank. Preferably, the positive-locking cut-outs are each introduced into an outer surface of the carrier part blank which bounds a fastening receptacle, which is, in particular formed as part of the cutting side of the carrier part blank.

In addition, a saw blade blank, in particular, the aforementioned saw blade blank, is proposed for producing a saw blade according to the disclosure, having at least one carrier part blank which has at least one cutting side, and with a plurality of insert blanks which are, in particular free of saw teeth, being mutually spaced on the carrier part blank, wherein the insert blanks are made of a material, in particular a carbide, which has a greater hardness than a material of the carrier part blank, wherein the insert blanks are each provided to form at least partially, in particular the aforementioned at least two saw teeth.

By way of the configuration of the saw blade blank according to the disclosure, an advantageously high level of stability and robustness of the saw blade in relation to bending and torsion forces can be achieved during a sawing operation. Advantageously, at the same time, an advantageously small tooth pitch of the saw blade can be enabled. Compared to saw blades with inserts configured as toothed bars, which each form a plurality of saw teeth, an advantageously high level of stability of the saw blade in relation to fractures and in relation to a detachment of the inserts during a sawing operation can be achieved. An advantageously simple and inexpensive forming of saw teeth from the inserts can be enabled, in particular for the production of advantageously small tooth pitches, preferably in comparison with saw blades having inserts which each form a single saw tooth. Advantageously, a high level of flexibility of the saw blade can be ensured.

Preferably, the saw blade blank is formed from the carrier part blank and the insert blanks, in particular free of saw teeth, fastened to the carrier part blank. Preferably, the carrier part blank is produced prior to a formation of the saw blade blank. Preferably, the carrier part blank is made from a machined semi-finished product. Preferably, the insert blanks are each formed from a semi-finished product, in particular, prior to an arrangement on the carrier part blank, and in particular are brought into the basic shape which is, viewed in particular perpendicularly to the main extension plane of the carrier part blank and/or to a main extension plane of the insert blanks, at least substantially round, in particular circular, half-moon-shaped, drop-shaped or partially cylindrical. Preferably, the inserts forming, in particular the saw teeth are produced by means of a grinding method and/or a milling method from the insert blanks fastened to the carrier part blank, wherein in particular the saw blade is formed with the carrier part and the inserts.

In addition, a carrier part blank for producing a saw blade according to the disclosure is formed, having at least one base body, which on at least one side forms a plurality of, in particular, the aforementioned, fastening receptacles for a receiving of, in particular the aforementioned, inserts, wherein a ratio of a number of, in particular the aforementioned, saw teeth to be formed on the saw blade to a number of the fastening receptacles is at least 2, in particular 2, 3 or 4. Preferably, the ratio of the number of saw teeth to be formed on the saw blade to the number of fastening receptacles is not more than 4, preferably not more than 3, and preferably exactly 2. Preferably, the fastening receptacles each have, viewed in particular, perpendicularly to a main extension plane of the carrier part blank, a round and/or an at least substantially triangular or circular basic shape. Preferably, a maximum width of the individual fastening receptacles, particularly along a cut edge to be formed and/or along the cutting side, is at least 70%, preferably at least 80%, and more preferably at least 90%, and/or not more than 150%, preferably not more than 130%, and more preferably not more than 120% of a maximum width of insert blanks to be arranged on the carrier part blank, in particular, to form the saw teeth. Preferably, the maximum width of the individual fastening receptacles is at least 1.5 mm, preferably at least 2 mm, and more preferably at least 2.3 mm, and/or not more than 7 mm, preferably not more than 5 mm, and more preferably not more than 3 mm.

By way of the configuration of the carrier part blank according to the disclosure, an advantageously high level of stability and robustness of the saw blade produced therefrom in relation to bending and torsion forces during a sawing operation can be achieved. Advantageously, at the same time, an advantageously small tooth pitch of the saw blade can be enabled. Compared to saw blades with inserts configured as toothed bars, which each form a plurality of saw teeth, an advantageously high level of stability of the saw blade in relation to fractures and in relation to a detachment of the inserts during a sawing operation can be achieved. An advantageously simple and inexpensive forming of saw teeth from the inserts can be enabled, in particular for the production of advantageously small tooth pitches, preferably in comparison with saw blades having inserts which each form a single saw tooth. Advantageously, a high level of flexibility of the saw blade can be ensured.

The saw blade according to the disclosure, the method according to the disclosure and/or the saw blade blank according to the disclosure is/are not to be limited to the application and embodiment described above. In order to fulfill a functionality described herein, the saw blade according to the disclosure, the method according to the disclosure and/or the saw blade blank according to the disclosure can, in particular have a number of individual elements, components, components, and units as well as method steps that deviates from a number mentioned herein.

BRIEF DESCRIPTION OF THE DRAWINGS

Further advantages are revealed in the following description of the drawings. Six embodiment examples of the disclosure are illustrated in the drawings. The drawings, the description, and the claims contain numerous features in combination. A person skilled in the art will suitably also consider the features individually and combine them into useful further combinations.

The drawings show.

DETAILED DESCRIPTION

Figure 1:
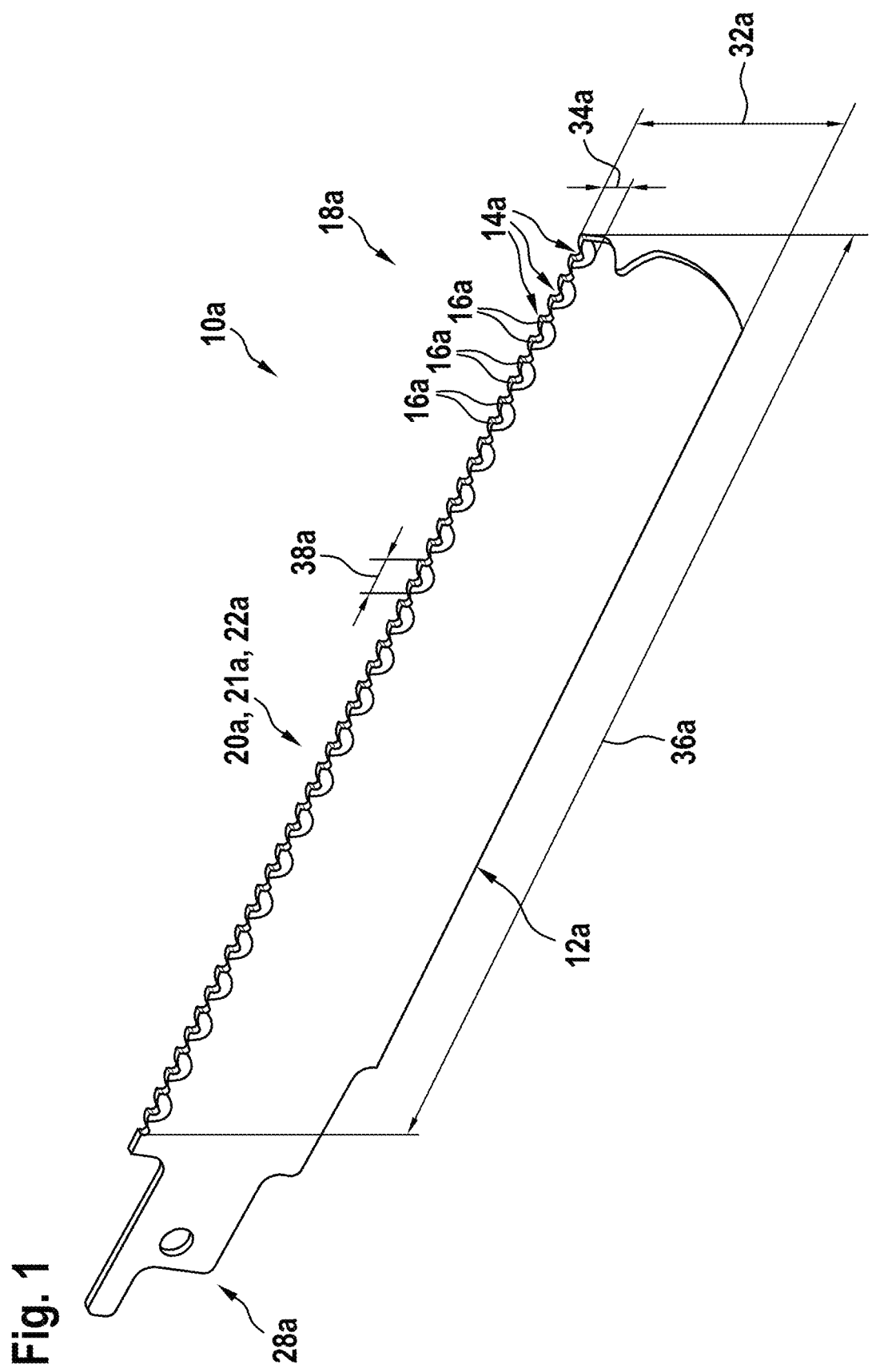
FIG. 1 a perspective representation of a saw blade according to the disclosure, which was produced by a method according to the disclosure, FIG. 2 a schematic side view of the saw blade according to the disclosure in a region of saw teeth of the saw blade formed from a carrier part and multiple inserts of the saw blade, FIG. 3 a schematic side view of the saw blade according to the disclosure along a cutting edge of the saw blade, wherein the saw teeth have a clearance angle grind, FIG. 4 a schematic representation of an exemplary sequence of the method for producing the saw blade according to the disclosure, FIG. 5 a schematic representation of a carrier part blank for producing the saw blade according to the disclosure prior to an arrangement of insert blanks, FIG. 6 a schematic side view of a saw blade blank according to the disclosure for producing the saw blade according to the disclosure with insert blanks which are welded to the carrier part blank according to FIG. 5, FIG. 7 a schematic representation of an alternative configuration of a carrier part blank for producing the saw blade according to the disclosure prior to an arrangement of insert blanks, FIG. 8 a schematic side view of the saw blade according to the disclosure, which is made from the carrier part blank according to FIG. 7, in a region of saw teeth of the saw blade, which are formed from a carrier part, a weld melt and multiple inserts of the saw blade, FIG. 9 a schematic plan view of an alternative configuration of a saw blade according to the disclosure with a curved cut edge of the saw blade, FIG. 10 a schematic detailed view of saw teeth of the alternative configuration of the saw blade according to FIG. 9, FIG. 11 a schematic representation of a further alternative configuration of a saw blade according to the disclosure with a circular cut edge, and FIG. 12 a schematic side view of another alternative configuration of a saw blade according to the disclosure along a cutting edge of the saw blade with cross-set saw teeth.

In FIG. 1, a saw blade 10a for a reciprocating saw is shown. The saw blade 10a comprises a carrier part 12a and a plurality of inserts 14a. The saw blade 10a comprises a plurality of saw teeth 16a arranged in a rectilinear continuous tooth profile 18a. The saw teeth 16a form a rectilinear cut edge 20a. The saw teeth 16a form a cutting edge 21a. The carrier part 12a has a cutting side 22a, which faces, in particular toward the cut edge 20a. The inserts 14a are arranged spaced from one another. The inserts 14a are arranged on the cutting side 22a of the carrier part 12a, on the carrier part 12a, and fastened to the carrier part 12a, in particular on the cutting side 22a. The saw blade 10a has a main extension plane 24a (not shown in FIG. 1) which is oriented parallel to the cut edge 20a and comprises a main extension plane 26a of the carrier part 12a. The saw blade 10a comprises a connection region 28a to a fastening of the saw blade 10a to the reciprocating saw. The connection region 28a is formed integrally with the carrier part 12a. The saw blade 10a is provided, in particular, for a drive movement along a linear drive axis. Alternative configurations of the saw blade 10a are also conceivable, for example with more than one cutting edge 21a and/or cut edge 20a, with more than one tooth profile 18a, with at least one curved cut edge 20a, with a circular basic shape, for example as a saw blade 10a for a hole saw, or the like. Preferably, the carrier part 12a is formed at least partially planar. Preferably, the saw blade 10a is formed free of a chip guiding step.

The inserts 14a are at least substantially entirely formed of a carbide having a greater hardness than a material of the carrier part 12a, wherein the inserts 14a are each fastened to the at least one cutting side 22a of the carrier part 12a. Preferably, the material of the inserts 14a has a temperature resistance of at least 800° C., preferably at least 1000° C., and more preferably at least 1100° C. The carrier part 12a is at least substantially entirely formed from a carbon steel. In particular, the inserts 14a are arranged along an imaginary straight line on the carrier part 12a. The inserts 14a are arranged on the at least one cutting side 22a at a consistent spacing 30a from one another (see FIG. 2). The saw blade 10a has a maximum height 32a between the cut edge 20a and the saw blade back, which is in particular oriented at least substantially perpendicularly to the cut edge 20a and at least substantially within the main extension plane 24a of the saw blade 10a. Preferably, a ratio of the maximum height 32a of the saw blade 10a and a maximum height 34a of the individual inserts 14a, which is oriented at least substantially perpendicularly to the cut edge 20a and at least substantially within the main extension plane 24a of the saw blade 10a, is at least 3, preferably 5 to 10, but sometimes also more than 15, for example, 20 to 50. Preferably, a ratio between a total cutting length 36a of the saw blade 10a and a maximum length 38a of the individual inserts 14a, which, in particular, extends along the cut edge 20a formed by the saw teeth 16a formed by the inserts 14a, is at least 10, preferably 20 to 40, sometimes also more than 50 or more than 70. The inserts 14a of the saw blade 10a are each arranged at an equal spacing and the same orientation relative to the cut edge 20a and/or the carrier part 12a. The saw blade 10a comprises, in particular, 22 inserts 14a and 44 saw teeth 16a. The inserts 14a each at least partially form exactly two saw teeth 16a. In particular, the maximum length 38a of the individual inserts 14a, which runs, in particular, in each case, along the cut edge 20a formed by the saw teeth 16a formed by the inserts 14a, is at least 1.5 mm, preferably at least 2 mm and more preferably at least 2.3 mm and/or not more than 7 mm, preferably not more than 6 mm and more preferably not more than 5 mm. The maximum length 38a of the individual inserts 14a, which extends in particular, in each case, along the cut edge 20a formed by the saw teeth 16a formed by the inserts 14a, is particularly preferably at least substantially 2.5 mm. Other configurations of the saw blade 10a, in particular, the inserts 14a, are also conceivable, for example, wherein the inserts 14a each at least partially form more than two, preferably not more than 4, and preferably not more than 3 saw teeth 16a.

Figure 2:
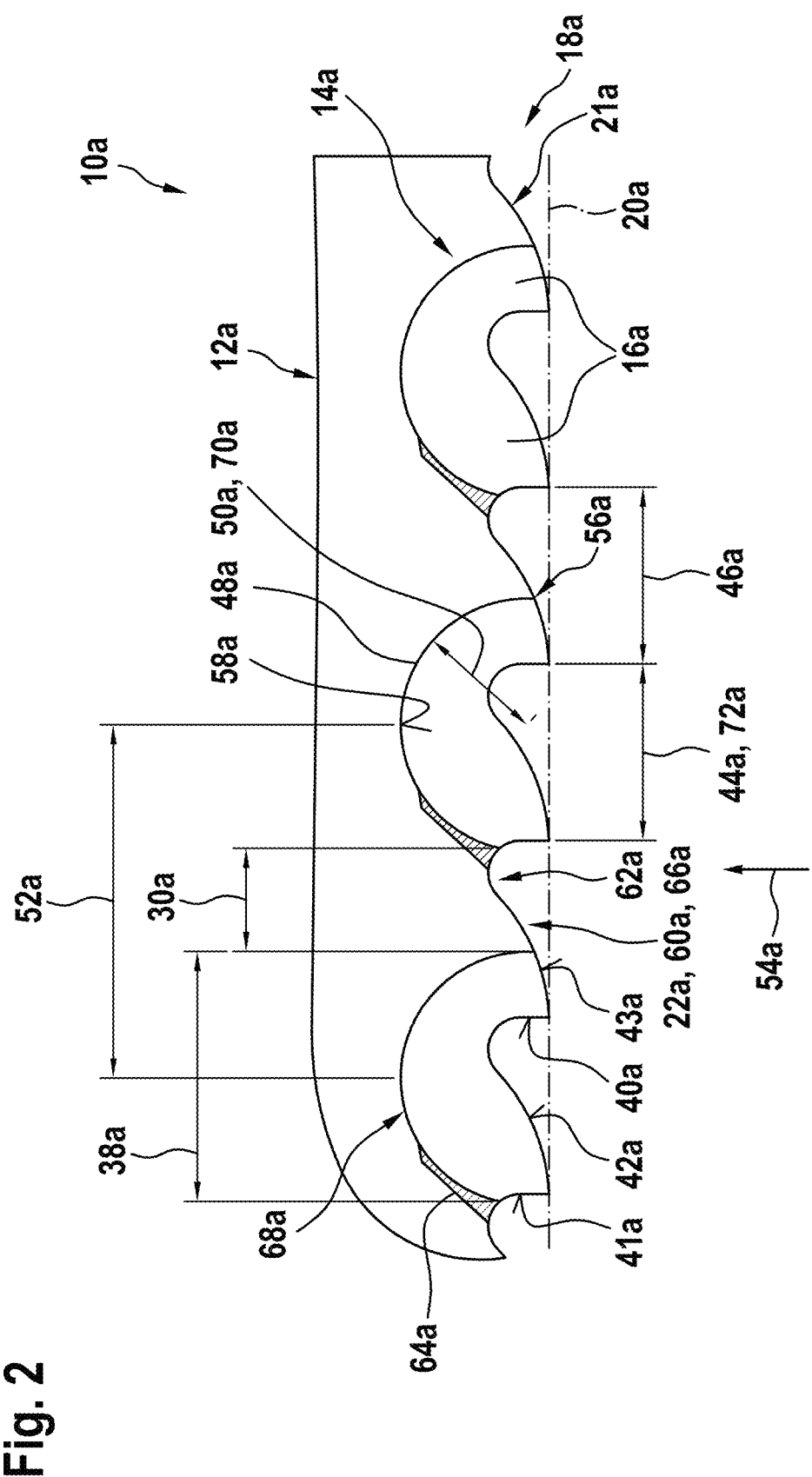

FIG. 2 shows a side view of the saw blade 10a in an region of the cutting edge 21a, which in particular comprises three inserts 14a. The inserts 14a each at least partially form two cutting surfaces 40a, 41a and two flank surfaces 42a, 43a of the saw teeth 16a. Saw teeth 16a, of the plurality of saw teeth 16a, that are arranged at least partially between adjacent inserts 14a are each formed at least partially by the material of the carrier part 12a and at least partially by a weld melt 64a. The saw teeth 16a each have, in particular, a parabolic tooth shape. The inserts 14a each at least partially form exactly two saw teeth 16a, wherein the two flank surfaces 42a, 43a and the two cutting surfaces 40a, 41a are formed as part of the two saw teeth 16a. Each of the inserts 14a at least substantially completely forms a cutting surface 40a of a saw tooth 16a and a flank surface 42a of a further saw tooth 16a, which are arranged adjacent to one another, viewed in particular, at least substantially perpendicularly to the at least one cutting edge 20a, and each at least largely forms a cutting surface 41a of the further saw tooth 16a and a flank surface 43a of the saw tooth 16a. The inserts 14a each completely form two cutting surfaces 40a, 41a of the saw teeth 16a and a flank surface 42a of the saw teeth 16a and another flank surface 43a of the saw teeth 16a at least partially. Preferably, the inserts 14a at least largely form the saw tooth 16a and the further saw tooth 16a arranged adjacent to the saw tooth 16a, in particular with regard to a material forming the two saw teeth 16a and/or the length 38a parallel to the cut edge 20a formed by the two saw teeth 16a. The flank surfaces 42a, 43a of the saw teeth 16a are preferably formed in a curved fashion and extend in particular, from a tip to a tooth bottom 62a of a saw tooth 16a. In particular, the cutting surfaces 40a, 41a of the saw teeth 16a are formed at least substantially rectilinear. The tooth bottoms 62a of the saw teeth 16a are, in particular, formed circular. However, other configurations of the saw teeth 16a are conceivable, for example with a parabolic tooth bottom or the like. Alternatively, it is also conceivable that the saw teeth 16a and/or the inserts 14a have ground and/or inclined cutting surfaces 40a, 41a and/or flank surfaces 42a, 43a. The two saw teeth 16a formed at least partially by an insert 14a have, in particular, from tip to tip, a minimum spacing 44a, 46a of not more than 2 mm, preferably not more than 1.8 mm, and more preferably at least substantially 1.6 mm. Preferably, all the inserts 14a of the saw blade 10a are at least substantially identical. Preferably, two saw teeth 16a formed at least partially by a single insert 14a, have a spacing 44a, in particular, from tip to tip, which corresponds to a spacing 46a from one of the two saw teeth 16a formed at least partially by the insert 14a to another saw tooth 16a, which is formed at least partially by a further insert 14a arranged adjacent to the insert 14a on the carrier part 12a. Other configurations of the inserts 14a are conceivable, for example, wherein the individual inserts 14a at least partially form more than two cutting surfaces 40a, 41a and/or more than two flank surfaces 42a, 43a, in particular, not more than 4 cutting surfaces 40a, 41a and not more than 4 flank surfaces 42a, 43a.

The carrier part 12a has a plurality of fastening receptacles 48a along the cutting side 22a, wherein the inserts 14a are each connected to the carrier part 12a by way of the fastening receptacles 48a. The fastening receptacles 48a are each configured as a cut-out bounded by the carrier part 12a, wherein in particular the inserts 14a are each arranged at least partially in one of the fastening receptacles 48a configured as cut-outs. The fastening receptacles 48a are arranged on the cutting side 22a. Preferably, the inserts 14a are arranged and/or fastened on the carrier part 12a such that the saw blade 10a, viewed perpendicularly to the main extension plane 24a of the saw blade 10a, is formed free of gaps and/or cut-outs. The main extension plane 24a of the saw blade 10a and the main extension plane 26a of the carrier part 12a in FIG. 2 are arranged in particular at least substantially parallel to the image plane (cf. FIG. 3), and are thus not shown in FIG. 2. The fastening receptacles 48a are each formed, viewed perpendicularly to the main extension plane 26a, 24a of the carrier part 12a and/or of the saw blade 10a, circular segment-shaped. Preferably, the cutting side 22a of the carrier part 12a is configured differently from a straight and/or smooth configuration, wherein in particular the fastening receptacles 48a form regions of the cutting side 22a which deviate from a main extension axis of the cutting side 22a. In particular, the fastening receptacles 48a at least partially form the cutting side 22a. Preferably, the main extension axis of the cutting side 22a extends at least substantially parallel to the main extension plane 24a, 26a of the saw blade 10a and/or the carrier part 12a. In particular, a contour of the cutting side 22a, viewed at least substantially perpendicularly to the main extension plane 24a of the saw blade 10a, is visible on an exterior of the saw blade 10a. Preferably, the fastening receptacles 48a are each provided to receive exactly one insert 14a for fastening of the insert 14a to the carrier part 12a. In particular, for each insert 14a of the saw blade 10a, the carrier part 12a forms exactly one fastening receptacle 48a. In particular, the circular segment-shaped fastening receptacles 48a have an inner radius 50a of at least substantially 1.25 mm. The fastening receptacles 48a have, viewed along the cutting side 22a, in particular, from center point to center point, a minimum spacing 52a of at least substantially 3.2 mm. The inserts 14a each have the minimum spacing 30a along the cutting side 22a relative to one another which is not more than 2 mm, preferably not more than 1 mm, and more preferably at least substantially 0.7 mm. In particular, the minimum spacing 30a between each of the inserts 14a is at least 0.2 mm, preferably at least 0.4 mm, and more preferably at least 0.5 mm. The fastening receptacles 48a and the inserts 14a are arranged at regular intervals on the carrier part 12a, in particular on the cutting side 22a. In a direction 54a oriented at least substantially perpendicularly to the cut edge 20a and/or at least substantially parallel to the main extension plane 26a of the carrier part 12a, in particular the inserts 14a are each spaced by over 0.2 mm, preferably at least 0.3 mm, more preferably at least 0.4 mm, and particularly preferably over at least substantially 1.3 mm, embedded into the fastening receptacles 48a formed, in particular as cut-outs in the cutting side 22a, in particular relative to an outermost edge 56a of the support portion 12a. A ratio of a number of saw teeth 16a of the saw blade 10a to a number of the fastening receptacles 48a is at least substantially 2.

The inserts 14a are each welded to the carrier part 12a. In particular, the inserts 14a are welded to the carrier part 12a by way of inner surfaces 58a of the carrier part 12a bounding the fastening receptacles 48a. Preferably, the saw blade 10a, in particular, the inserts 14a, is formed free of expansion joints. In a preferred configuration of the saw blade 10a, the carrier part 12a is preferably not enclosed in any sectional plane by the inserts 14a. In particular, the inserts 14a and the carrier part 12a, viewed at least substantially perpendicularly to the main extension plane 24a of the saw blade 10a, are each arranged adjacent to one another and welded to one another along a common contour which, in particular, bounds a fastening receptacle 48a.

Sub-regions 60a of the saw teeth 16a, in particular, tooth bottoms 62a and/or flank surfaces 43a, between the inserts 14a are formed by the carrier part 12a and/or by the weld melt 64a. The sub-regions 60a form intermediate regions 66a of the carrier part 12a. The inserts 14a are spaced from one another via the intermediate regions 66a and, viewed at least substantially perpendicularly to the cutting edge 21a and/or to the cut edge 20a of the saw blade 10a, are arranged between the inserts 14a. Viewed along the cut edge 20a and/or the cutting side 22a, each second tooth bottom 62a and/or each second flank surface 43a is formed at least partially by the carrier part 12a and/or by the weld melt 64a. In particular, viewed along the cut edge 20a and/or the cutting side 22a, each second tooth bottom 62a is at least substantially completely formed by the carrier part 12a and/or the weld melt 64a. Preferably, the sub-regions 60a of the saw teeth 16a are each arranged, viewed in particular, perpendicularly to the main extension plane 24a, 26a of the carrier part 12a and/or the saw blade 10a, between two inserts 14a. In particular, every second tooth bottom 62a is formed at least partially by the carrier part 12a and at least partially by the weld melt 64a. A cutting surface 41a adjacent to these tooth bottoms 62a is at least substantially completely formed by an insert 14a. A flank surface 43a adjacent to these tooth bottoms 62a is formed at least partially by another insert 14a arranged, in particular, adjacent to the insert 14a. The sub-regions 60a of the saw teeth 16a and/or the intermediate regions 66a formed by the carrier part 12a are formed separately from the inserts 14a. In particular, the sub-regions 60a of the saw teeth 16a and/or the intermediate regions 66a formed by the carrier part 12a together with the inserts 14a form the saw teeth 16a of the saw blade 10a, which are in particular arranged in the continuous tooth profile 18a.

The inserts 14a, in particular, in a state fastened to the carrier part 12a, are each configured at least substantially round, in particular, circularly arcuate, on a side 68a facing toward the carrier part 12a. A radius 70a of the circularly arcuate side 68a of each the inserts 14a is at least substantially 1.25 mm. However, other configurations of the carrier part 12a and/or the inserts 14a are conceivable, for example with another basic shape of the inserts 14a and/or of the fastening receptacles 48a. The inserts 14a are each welded to the carrier part 12a by way of the side 68a facing toward the carrier part 12a. In particular, the side 68a of each insert 14a facing toward the carrier part 12a is formed corresponding to a shape of the fastening receptacles 48a of the carrier part 12a.

A tooth density of the saw blade 10a formed along the cut edge 20a is, in particular, at least 12 TPI, preferably more than 12 TPI, more preferably 14 TPI, 16 TPI, 18 TPI, or more. Preferably, the tooth density is at least 5.5 teeth per cm, in particular, 6.3 teeth per cm, 7.1 teeth per cm, or 7.9 teeth per cm. All the saw teeth 16a of the saw blade 10a are each formed at least partially from one of the inserts 14a. The minimum spacing 30a of the individual inserts 14a, which is in particular oriented at least substantially parallel to the cut edge 20a, is less than a maximum length 72a of the individual saw teeth 16a. The maximum length 72a of the individual saw teeth 16a corresponds at least substantially to 1.6 mm. Preferably, the saw blade 10a comprises exclusively saw teeth 16a which are formed at least partially from the material of the inserts 14a, in particular carbide. In particular, the saw blade 10a does not comprise any saw teeth 16a which are formed entirely from the material of the carrier part 12a.

In particular, the inserts 14a are connected to the carrier part 12a such that the weld melt 64a is disposed at least largely on one side of the inserts 14a, which is arranged in a direction on the inserts 14a, which points along the cut edge 20a, in each case, from a flank surface 42a, 43a of a saw tooth 16a to a cutting surface 41a, 40a of the saw tooth 16a. In particular, the side of the inserts 14a, on which the weld melt 64a is at least largely disposed, is less loaded by the saw blade 10a during a sawing operation than a side of the inserts 14a facing away from the side, in particular because during the sawing operation, a force acts on the saw teeth 16a predominantly oppositely to the direction, which points along the cut edge 20a, in each case, from a flank surface 42a, 43a of a saw tooth 16a to a cutting surface 41, 40a of the saw tooth. Preferably, the inserts 14a abut at least substantially directly against the carrier part 12a in a cutting direction of the saw teeth 16a, in particular, as far as possible without the weld melt 64a.

Figure 3:
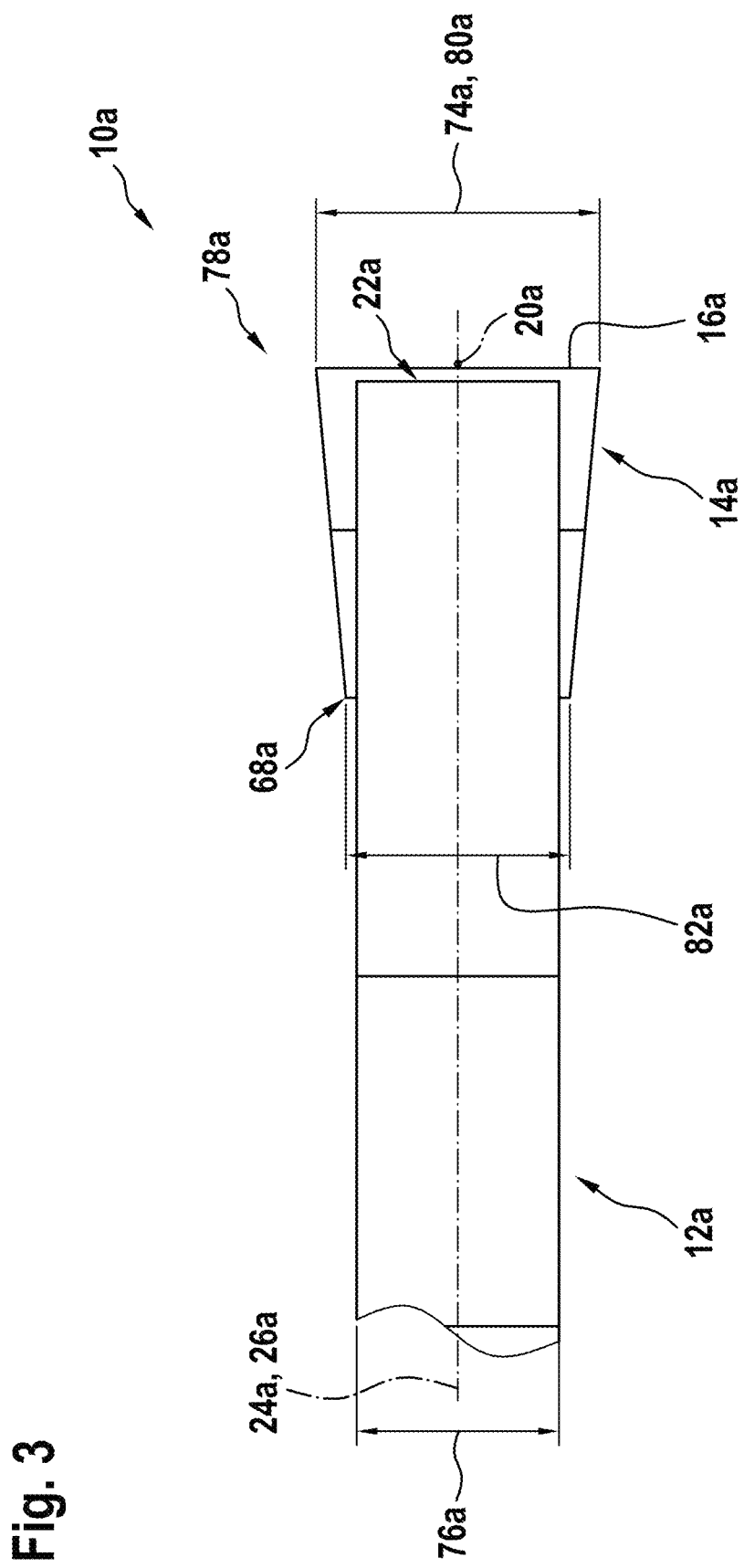

FIG. 3 shows a side view of the saw blade 10a along the cut edge 20a. The saw blade 10a has a maximum thickness 74a corresponding to a value from a range of values of between 0.5 mm and 5 mm, preferably between 1 mm and 4 mm and more preferably between 1.5 mm and 3 mm. In particular, the maximum thickness 74a of the saw blade 10a corresponds to a maximum thickness of the inserts 14a. The carrier part 12a has a maximum thickness 76a that is less than the maximum thickness 74a of the saw blade 10a and/or the maximum thickness of the inserts 14a. The saw blade 10a has a clearance cut 78a, which is achieved by a clearance angle grind of the saw teeth 16a. The saw teeth 16a each have a flat-tooth shape. Viewed along the cut edge 20a, the inserts 14a have a basic shape that is at least partially conical and/or trapezoidal. In particular, the inserts 14a each have a thickness 80a on a side facing toward the cut edge 20a, which is greater than a thickness 82a of the inserts 14a on a different side facing toward the carrier part 12a, in particular facing away from the side, in particular the rounded side 68a, of the inserts 14a. Other configurations of the saw blade 10a, in particular, a clearance 78a of the saw blade 10a, are also conceivable, for example via a cross-set of the saw teeth 16a (see FIG. 12), a serrated edge of the saw teeth 16a or the like.

Figure 4:
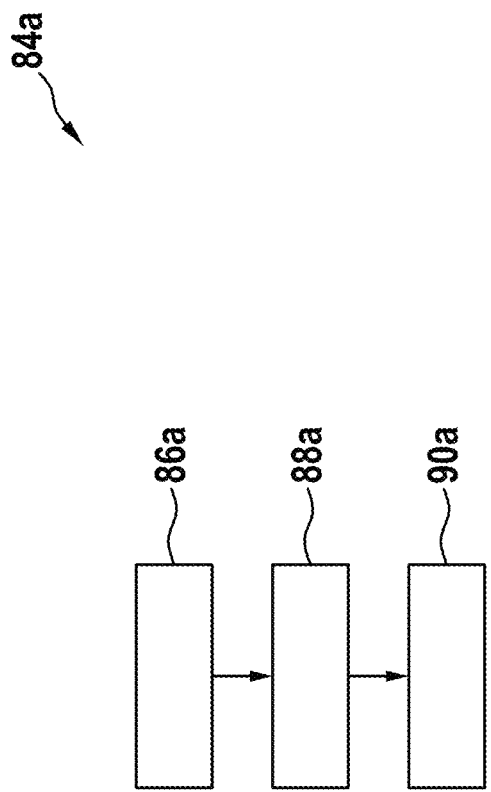

FIG. 4 shows an exemplary sequence of a method 84a for a production of the saw blade 10a. In a method step 86a of the method 84a, a carrier part blank 13a (see FIG. 5) for producing the saw blade 10a, in particular a saw blade blank 92a, is produced. The carrier part blank 13a is produced in a single method step, in particular the method step 86a, by way of a reshaping process, in particular a stamping process or a pressing processes, from a semi-finished product. In particular, during the reshaping process, the connection region 28a and the fastening receptacles 48a are formed. Alternatively, it is conceivable that the carrier part blank 13a is produced from a semi-finished product and in at least one further method step (not shown in FIG. 4), the connection region 28a and the fastening receptacles 48a are formed on the carrier part blank 13a or that, in particular, the carrier part blank 13a is produced by means of a punching method from a semi-finished product which already forms the connection region 28a, and in a further method step, the fastening receptacles 48a are formed on the carrier part blank 13a, in particular, by means of a grinding and/or milling method. In particular, the connection region 28a and the fastening receptacles 48a are formed prior to an arrangement of insert blanks 94a (see FIG. 6) on the carrier part blank 13a. In particular, the insert blanks 94a are each provided at least partially to form two saw teeth 16a of the plurality of saw teeth 16a of the saw blade 10a. Preferably, the carrier part blank 13a is formed by means of an introduction of the fastening receptacles 48a and an introduction of the connection region 28a. In addition or alternatively to the fastening receptacles 48a, it is conceivable that, in a method step of the method, in particular the method step 86a or a further method step (not shown in FIG. 4), in particular, prior to an arrangement of the insert blanks 94a on the carrier part blank 13a, at least one positive-locking cut-out (see FIG. 8) for a positive-locking connection to at least one of the insert blanks 94a is introduced into the carrier part blank 13a, wherein the positive-locking cut-out from the carrier part blank 13a, viewed at least substantially perpendicularly to a main extension plane 24a of the saw blade 10a, in particular the carrier part blank 13a, is at least substantially completely covered. Preferably, a plurality of positive-locking cut-outs are introduced into the carrier part blank 13a, wherein in particular a number of the positive-locking cut-outs corresponds to a number of the insert blanks 94a to be fastened on the carrier part blank 13a. Preferably, in an arrangement on the carrier part blank 13a, the insert blanks 94a are at least partially inserted into a positive-locking cut-out, in particular in a direction extending within a major extension plane of the carrier part blank 13a.

In a further method step 88a of the method 84a, the insert blanks 94a are spaced from one another at the cutting side 22a of the carrier part blank 13a and fastened to the carrier part blank 13a. In a method step of the method 84a, in particular, the method step 88a, the insert blanks 94a are welded to the carrier part blank 13a. In particular, by fastening the insert blanks 94a to the carrier part blank 13a, a saw blade blank 92a for producing the saw blade 10a is formed. In particular, the insert blanks 94a and the carrier part blank 13a are joined together in an integrally bonding manner by a resistance welding process. Prior to forming the saw teeth 16a, each viewed perpendicularly to the main extension plane of the carrier part blank 13a and/or to a main extension plane of the insert blanks 94a, the insert blanks 94a have a basic shape that is at least substantially round, in particular circular, half-moon-shaped, drop-shaped or partially cylindrical (cf. FIGS. 6, 8, 10 and 11).

In a further method step 90a of the method 84a, two saw teeth 16a are formed at least partially on each of the insert blanks 94a are, wherein in particular the inserts 14a are formed from the insert blanks 94. The saw teeth 16a are formed by means of a grinding method and/or by means of a milling method. The insert blanks 94a and regions of the carrier part blank 13a arranged between the insert blanks 94a, in particular, the intermediate regions 66a, and/or a weld melt 64a are/is machined to form the saw teeth 16a, wherein in particular the continuous tooth profile 18a is formed. Preferably, the saw teeth 16a are formed such that the saw teeth 16a of the saw blade 10a are formed by the inserts 14a, the carrier part 12a, in particular intermediate regions 66a of the carrier part 12a, and by the weld melt 64a. Particularly preferably, the insert blanks 94a are each machined such that exactly two saw teeth 16a are at least largely formed on each insert 14a. The saw teeth 16a are formed from the insert blanks 94a, the carrier part blank 13a and the weld melt 64a between the insert blanks 94a. The saw teeth 16a are formed such that a transition between the inserts 14a and the carrier part 12a and/or the weld melt 64a is configured at least substantially flush (see FIG. 2).

FIGS. 5 to 12 show further embodiment examples of the disclosure. The following descriptions and the drawings are essentially limited to the differences between the embodiment examples, wherein reference can, in principle, also be made, with respect to identically designated components, in particular with respect to components having the same reference numbers, to the drawings and/or the description of the other embodiment examples, in particular FIGS. 1 to 4. In order to distinguish the embodiment examples, the letter a is appended to the reference numbers of the embodiment example in FIGS. 1 to 4. In the embodiment examples of FIGS. 5 to 12, the letter a is replaced by the letters b to f.

Figure 5:
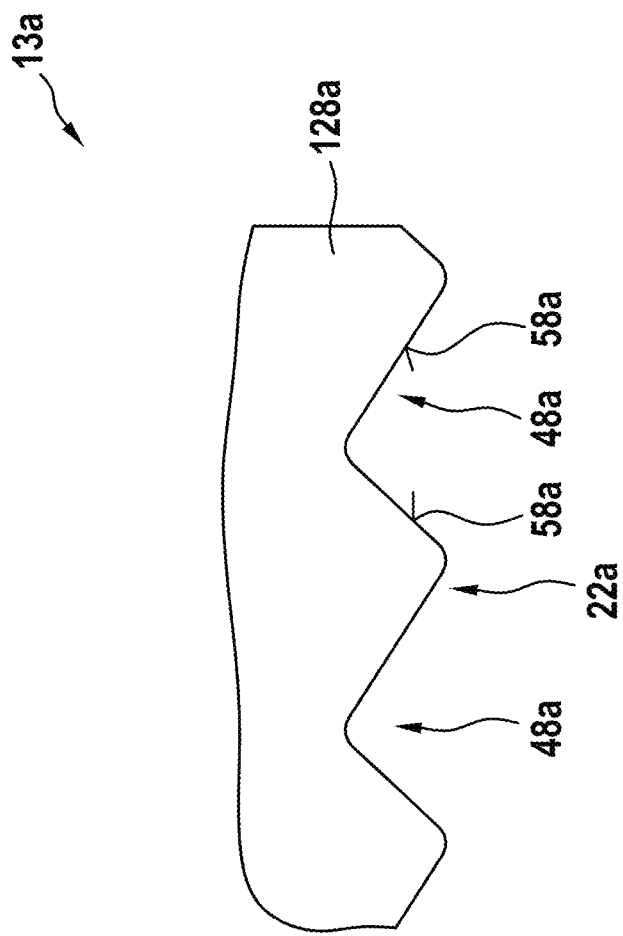

FIG. 5 shows a carrier part blank 13a for producing the saw blade 10a, in a region of the future cutting side 22a of the carrier part 12a. The carrier part blank 13a comprises a base body 128a, which on at least one side, in particular, the future cutting side 22a, bounds a plurality of fastening receptacles 48a for a receiving of the inserts 14a, in particular insert blanks 94a (see FIG. 6) for forming the inserts 14a. A ratio of a number of saw teeth 16a to a number of the fastening receptacles 48a to be formed on the saw blade 10a is 2. The carrier part blank 13a is shown in a production process step prior to an arrangement of inserts 14a, in particular insert blanks 94a, for a production of a saw blade blank 92a. The fastening receptacles 48a bounded by the base body 128a of the carrier part blank 13a each have a basic shape, viewed in particular, perpendicularly to a main extension plane of the carrier part blank 13a and/or the saw blade 10a that is to be produced, that is at least substantially triangular.

Figure 6:
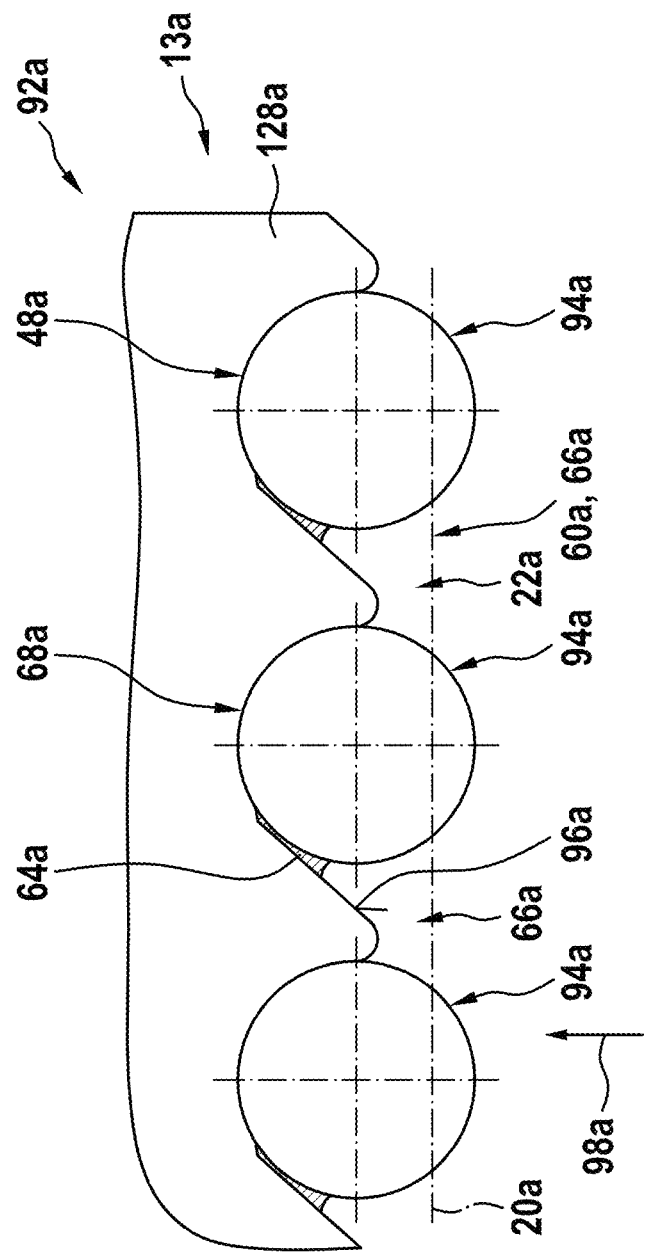

The fastening receptacles 48a have an asymmetrical basic shape, wherein one of two inner surfaces 58a of the carrier part blank 13a, which bound the fastening receptacles 48a, is provided to receive an insert blank 94a (cf. FIG. 6). As can be seen, in particular in FIG. 6, an intermediate space between the insert blanks 94a and the carrier part blank 13a, in particular, the other inner surface of the two inner surfaces 58a bounding the fastening receptacles 48a of the carrier part blank 13a, is filled with weld melt during welding of the insert blank 94a to the carrier part blank 13a.

In FIG. 6, a saw blade blank 92*a* for producing the saw blade 10*a* is shown, wherein in particular a plurality of insert blanks 94*a* is embedded into the fastening receptacles 48*a* of the carrier part blank 13*a* shown in FIG. 5. The saw blade blank 92*a* comprises the carrier part 12*a* having the cutting side 22*a*, and the plurality of insert blanks 94*a* which are arranged spaced from one another on the carrier part blank 13*a*, in particular the cutting side 22*a*, wherein the insert blanks 94*a* are formed from a material, in particular a carbide, which has a greater hardness than a material of the carrier part 12*a*, in particular the carrier part blank 13*a*. The insert blanks 94*a* are each welded to the carrier part blank 13*a*. The carrier part 12*a* forms intermediate regions 66*a* between each of the insert blanks 94*a*, wherein in particular the cutting side 22*a* at least partially forms an outer side surface 96*a* of the saw blade blank 92*a*, in particular between the insert blanks 94*a*. The insert blanks 94*a* are each connected to the carrier part 12*a* by way of the fastening receptacles 48*a*. The insert blanks 94*a* are welded to the carrier part 12*a* such that no intermediate spaces occur between the inserts 14*a* and the carrier part 12*a* along a direction 98*a* oriented perpendicularly to a future cut edge 20*a* of the saw blade 10*a* and parallel to a main extension plane of the carrier part 12*a*. In particular, such intermediate spaces are filled with weld melt 64*a*. The insert blanks 94*a*, the intermediate regions 66*a* of the carrier part 12*a* and the weld melt 64*a* are machined to produce the saw blade 10*a* from the saw blade blank 92*a*, in particular, by way of a grinding method and/or a milling method, such that the inserts 14*a* each at least partially form exactly two saw teeth 16*a* (cf. FIG. 2). In particular, after forming of the saw teeth 16*a*, the inserts 14*a*, the intermediate regions 66*a* of the carrier part 12*a* and the weld melt 64*a* form a continuous tooth profile (not shown in FIG. 6; see FIG. 2). Preferably, the insert blanks 94*a* are arranged in the fastening receptacles 48*a*, in particular fastened, such that the individual insert blanks 94*a* each abut, at least largely, in particular at least substantially completely, in a two-dimensional manner, an inner surface 58*a* of the carrier blank part 13*a* which bounds one of the fastening receptacles 48*a*, in a direction which, in particular, in the saw blade 10*a* to be produced, corresponds to a direction extending along the cut edge 20*a* from a cutting surface 40*a*, 41*a* of a saw tooth 16*a* to a flank surface 43*a*, 42*a* of the saw tooth 16*a* (see FIG. 2).

Figure 7:
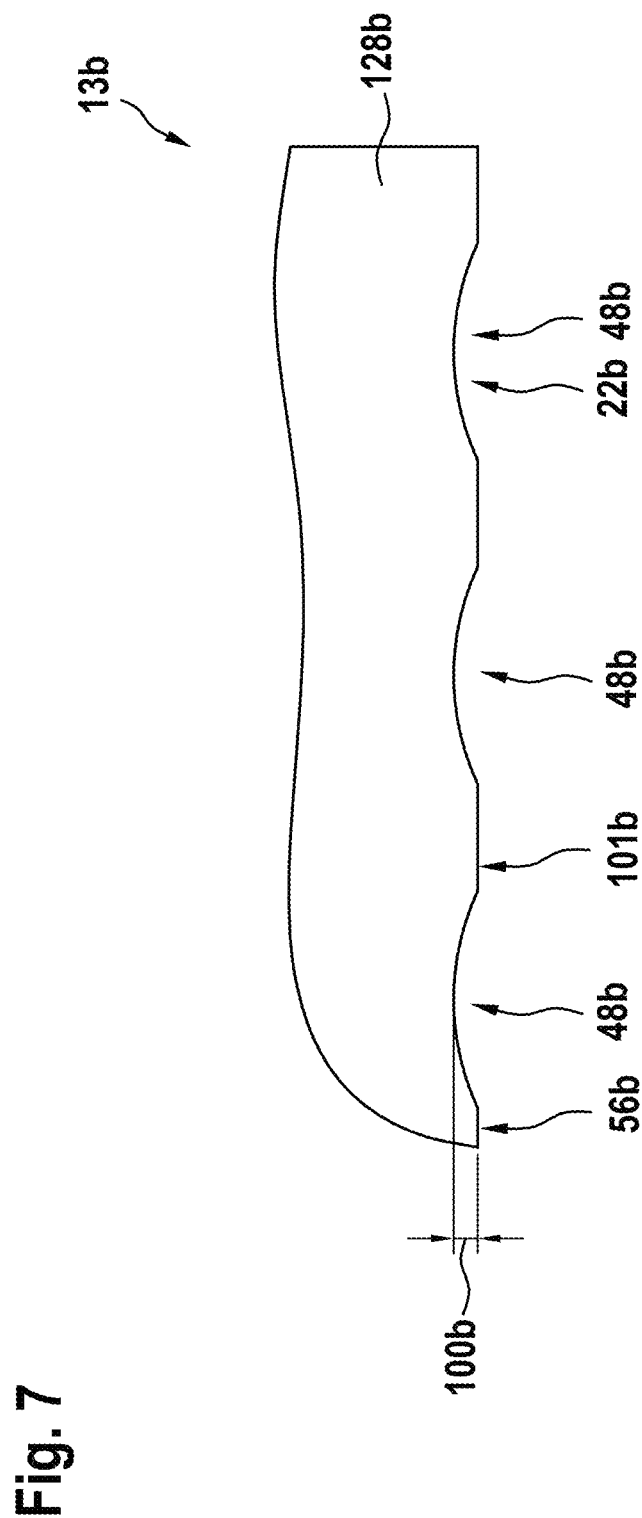

FIG. 7 shows an alternative configuration of a carrier part blank 13*b* for producing a saw blade 10*b* in a region of a future cutting side 22*b* of a carrier part 12*b* of the saw blade 10*b*. The carrier part blank 13*b* is shown in a method step prior to an arrangement of inserts 14*b*, particularly of insert blanks 94*b* (not shown in FIG. 7) on the carrier part blank 13*b*. The carrier part blank 13*b* includes a base body 128*b* which, on one side, bounds a plurality of fastening receptacles 48*b*. A ratio of a number of saw teeth 16*b* (see FIG. 8) to a number of the fastening receptacles 48*b* to be formed on the saw blade 10*b* is 2. The carrier part blank 13*b* shown in FIG. 7 has a design at least substantially analogous to the carrier part blank 13*a* described in relation to FIGS. 1 to 6, so that, with respect to a design of the carrier part blank 13*b* shown in FIG. 7, reference can be made at least substantially to the description relating to FIGS. 1 to 6. In contrast to the carrier part blank 13*a* described in relation to FIGS. 1 to 6, the carrier part blank 13*b* shown in FIG. 7 preferably comprises a plurality of fastening receptacles 48*b*, each having a lower depth 100*b* relative to an outer edge 56*b* of the carrier part 12*b* than the fastening receptacles 48*a* described in relation to FIGS. 1 to 6. In particular, the depth 100*b* of the fastening receptacles 48*b* is at least substantially 0.3 mm. The fastening receptacles 48*b* are formed as cutouts bounded by the carrier part blank 12*b*, in particular, a base body of the carrier part blank 13*b*. In particular, the fastening receptacles 48*b*, viewed perpendicularly to a main extension plane of the carrier part blank 13*b*, in particular, the saw blade 10*b* to be produced, are configured circular segment-shaped. Regions 101*b* of the carrier part blank 13*b* which are arranged between the fastening receptacles 48*b* are configured planar and/or, viewed perpendicularly to the main extension plane of the carrier part blank 13*b*, in particular of the saw blade 10*b* to be produced, rectilinear. Configurations of the carrier part blank 13*b* are also conceivable, wherein the fastening receptacles 48*b* have a greater depth 100*b*. Preferably, the depth 100*b* of the fastening receptacles 48*b* corresponds to not more than a maximum width of the inserts 14*b* and/or insert blanks 94*b* (not shown in FIG. 7) to be fastened to the fastening receptacles 48*b*, in particular an abutment surface of the inserts 14*b* and/or the insert blanks 94*b*. Preferably, the depth 100*b* of the fastening receptacles 48*b* corresponds to not more than 3 mm, preferably not more than 2 mm, preferably not more than 1.5 mm, and more preferably at least substantially 1.25 mm. Other configurations of the carrier part blank 13*b*, in particular, the fastening receptacles 48*b*, are also conceivable, for example with a merely partially round and/or an elongate basic shape, for example in a configuration in which the insert blanks 94*b* are provided for forming more than two saw teeth 16*b*.

Figure 8:
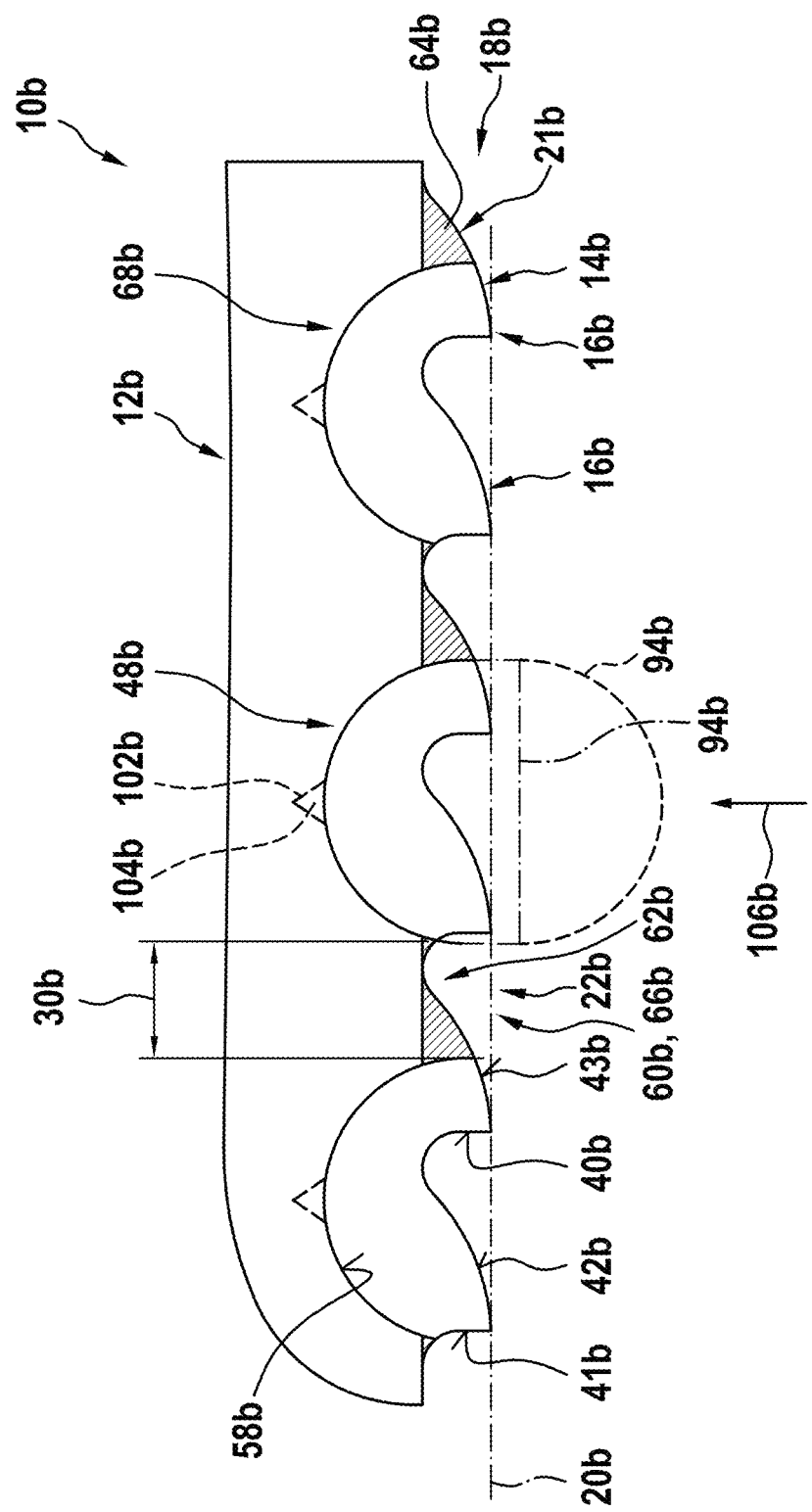

FIG. 8 shows the saw blade 10*b* with a carrier part 12*b* formed from the carrier part blank 13*b* shown in FIG. 7. The inserts 14*b* are each arranged in one of the fastening receptacles 48*b*, in particular, connected thereto. The inserts 14*b* are each welded to the carrier part 12*b*. Preferably, during welding of the insert blanks 94*b* to the carrier part blank 13*b*, a weld melt 64*b* is pressed at least partially perpendicularly to the main extension plane of the carrier part blank 13*b*, in particular, to the image plane of FIG. 8. In particular, during welding of the insert blanks 94*b* to the carrier part blank 13*b*, the weld melt 64*b* is, in particular, additionally pressed into the intermediate regions 66*b* between the insert blanks 94*b*, wherein in particular, in the production of the saw blade 10*b* from a saw blade blank 92*b*, saw teeth 16*b* of the saw blade 10*b* are formed in the intermediate regions 66*b* at least largely by the weld melt 64*b*, in particular, by way of grinding and/or milling of the weld melt 64*b*. The saw blade 10*b* shown in FIG. 8 has a design at least substantially analogous to the saw blade 10*a* described in relation to FIGS. 1 to 4, so that reference can be made, with respect to a design of the saw blade 10*b* shown in FIG. 8, at least substantially to the description relating to FIGS. 1 to 4. In contrast to the saw blade 10*a* described in relation to FIGS. 1 to 4, the saw blade 10*b* shown in FIG. 8 preferably has a tooth profile 18*b* which, between the inserts 14*b*, is formed at least largely from a shaped weld melt 64*b*. Every second tooth bottom 62*b* of the tooth profile 18*b*, which is, in particular, arranged in intermediate regions 66*b*, is at least largely formed by a weld melt 64*b* and the carrier part 12*b*. A basic shape of insert blanks 94*b*, which have been arranged, in particular, before a forming of saw teeth 16*b*, on the carrier part blank 13*b* and have been welded to the carrier part blank 13*b* and/or from which the saw teeth 16*b* and the inserts 14*b* have been formed, is suggested in FIG. 8. The basic shape of the inserts 14*b*, in particular, the insert blanks 94*b*, is considered, in particular, perpendicular to a main extension plane of the saw blade 10*b* (not shown in FIG. 8), for example circular or partially cylindrical. However, other designs of the inserts 14*b*, in particular, the insert blanks 94b, are conceivable, for example, with a drop-shaped basic shape or the like. Preferably, the inserts 14b, in particular, the insert blanks 94b, are designed, viewed along a cut edge 20b of the saw blade 10b, rectangular, conical, at least partially drop-shaped or the like (cf. FIG. 3). It is also conceivable that, in the intermediate regions 66b, the saw teeth 16b are formed partially by the weld melt 64b and partially by the carrier part 12b (cf. FIG. 2). The carrier part is not ground and/or milled during a production of the saw blade 10b and/or for forming the saw teeth 16b. In particular, only the weld melt 64b between the inserts 14b is ground and/or milled to form the saw teeth 16b. Preferably, the inserts 14b and the weld melt 64b form the saw teeth 16b of the saw blade 10b. In particular, viewed, in particular along the cut edge 20b, every second tooth bottom 62b of the saw teeth 16b of the saw blade 10b is, in particular at least largely, formed by the weld melt 64b.

It is conceivable that the carrier part 12b, in particular, the carrier part blank 13b, has at least one positive-locking cut-out 102b or a plurality of positive-locking cut-outs 102b to form a positive-locking joint with at least one of the inserts 14b. In particular, the positive-locking cut-out(s) 102b are/is introduced into the carrier part 12b prior to an arrangement of the inserts 14b on the carrier part 12b. Viewed at least substantially perpendicularly to the main extension plane of the saw blade 10b, in particular the carrier part 12b, the positive-locking cut-out(s) 102b is/are at least substantially completely covered by the carrier part 12b, in particular the carrier part blank 13b. The positive-locking cut-outs 102b are arranged on inner surfaces 58b bounding the fastening receptacles 48b of the carrier part 12b, in particular the carrier part blank 13b. In particular, the positive-locking cut-out(s) 102b is/are provided for the insert blanks 94b, when they are arranged on the carrier part blank 13b, to be at least partially inserted into the positive-locking cut-out(s) 102b, in particular in a direction 106b extending perpendicularly to the cut edge 20b and at least substantially parallel to the main extension plane of the carrier part blank 13b. Preferably, the inserts 14b, in particular the insert blanks 94b, each form a positive-locking projection 104b, preferably on a side 68b facing toward the carrier part 12b, in particular toward the carrier part blank 13b, which is provided, in particular to be inserted into the positive-locking cut-outs 102b. In particular, a number of positive-locking cut-outs 102b bounded by the carrier part 12b, in particular, the carrier part blank 13b, corresponds to a number of inserts 14b of the saw blade 10b. Preferably, each insert 14b of the saw blade 10b is arranged at least partially in one of the positive-locking cut-outs 102b, in particular connected thereto. Preferably, the inserts 14b are fastened to the carrier part 12b within the positive-locking cut-outs 102b, in particular welded to the carrier part 12b. Alternatively, it is conceivable that the carrier part 12b, in particular the carrier part blank 13b, does not comprise any fastening receptacles 48b, wherein in particular the cutting side 22b is formed at least largely flat, and merely comprises a plurality of positive-locking cut-outs 102b for a fastening of the inserts 14b, in particular the insert blanks 94b. In particular, the positive-locking cut-outs 102b are disposed on the cutting side 22b. Alternatively, configurations of the saw blade 10b without positive-locking cut-outs 102b are also conceivable, in particular, similar to the saw blade 10a described in relation to FIGS. 1 to 6. Alternatively, it is conceivable that the positive-locking cut-outs 102b are formed over a full width of the carrier part 12b, in particular, of the carrier part blank 13b.

Figure 9:
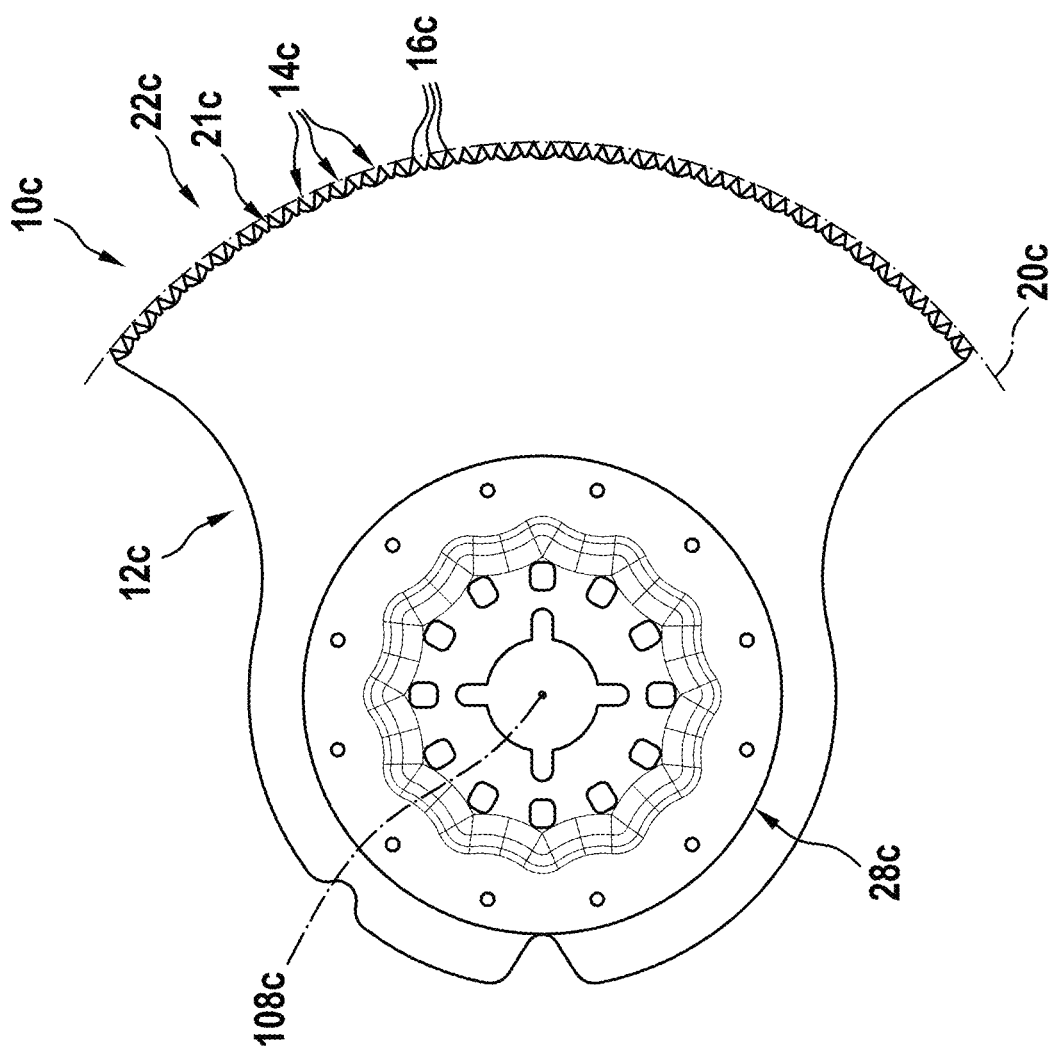

FIG. 9 shows an alternative configuration of a saw blade 10c in a plan view, viewed, in particular perpendicularly to a main extension plane of the saw blade 10c (not shown in FIG. 9). The saw blade 10c comprises a carrier part 12c which has at least one cutting side 22c and a plurality of mutually spaced inserts 14c, wherein the inserts 14c are formed of a material, in particular a carbide, which has a greater hardness than a material of the carrier part 12c, wherein the inserts 14c are each fastened to the at least one cutting side 22c of the carrier part 12c. Each of the inserts 14c at least partially forms two saw teeth 16c. The saw blade 10c shown in FIG. 9 has a design at least substantially analogous to the saw blade 10a described in relation to FIGS. 1 to 4, so that with respect to a design of the saw blade 10c shown in FIG. 9, reference can be made at least substantially to the description relating to FIGS. 1 to 4. In contrast to the saw blade 10a described in relation to FIGS. 1 to 4, the saw blade 10c shown in FIG. 9 preferably has exactly one curved cut edge 20c. The cut edge 20c has a circularly arcuate basic shape. In particular, the saw blade 10c is provided for use with an oscillating multi-function machine tool. Preferably, the saw blade 10c is provided, in particular for a sawing operation, to be moved about a drive axis 108c oriented perpendicularly to the main extension plane of the saw blade 10c. The saw blade 10c comprises a connection region 28c for a fastening to the multi-function tool machine. The connection region 28c is formed as a separate component and is connected to the carrier part 12c in a frictionally connected and/or positive-locking manner. It is conceivable that the connection region 28c is connected to the carrier part 12c in an integrally bonded manner. The inserts 14c are arranged on the carrier part 12c along the curved cutting side 22c of the carrier part 12c.

Figure 10:
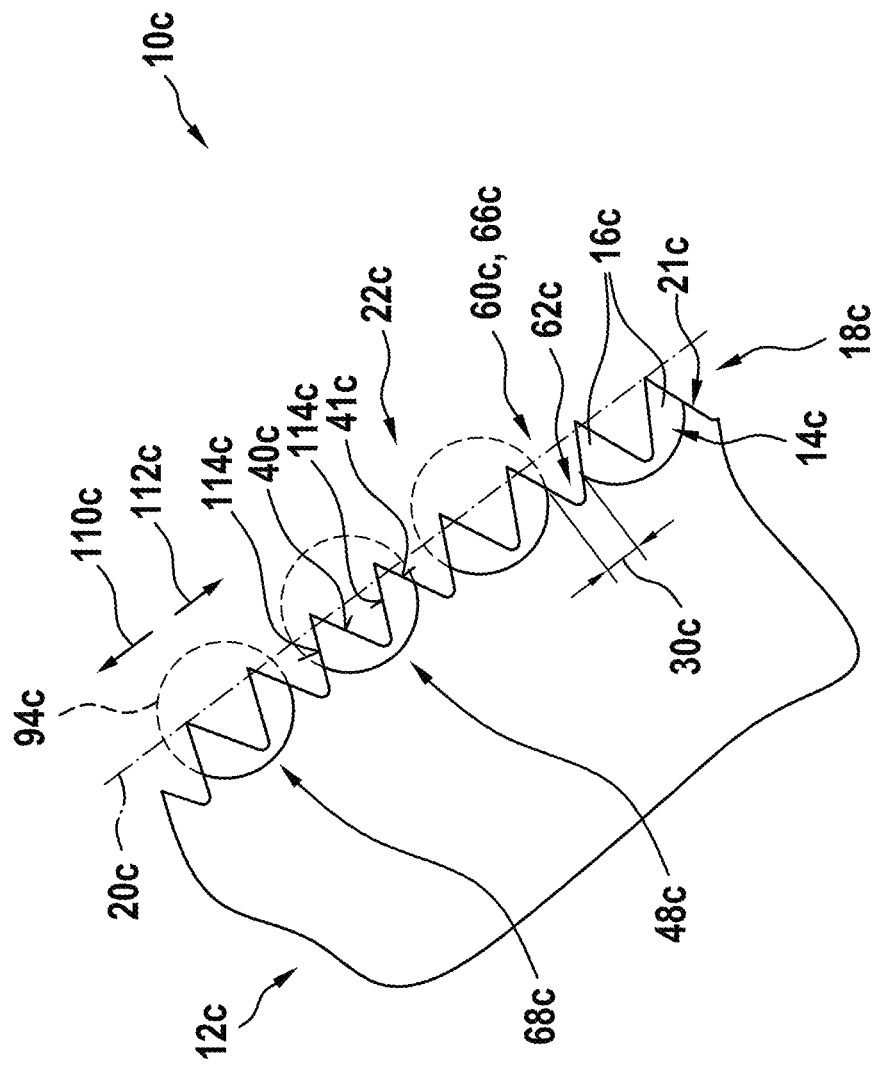

FIG. 10 shows a detail view of the alternative configuration of the saw blade 10c in a region of the cut edge 20c. The saw teeth 16c each have an angular tooth shape. The inserts 14c each at least partially form exactly two saw teeth 16c. The inserts 14c are arranged mutually spaced on the cutting side 22c. In particular, every second tooth bottom 62c of the saw teeth 16c is formed by the carrier part 12c, in particular, intermediate regions 66c of the carrier part 12c. The carrier part 12c and the inserts 14c form a tooth profile 18c. The saw teeth 16c are provided for sawing in two different directions 110c, 112c oriented along the cut edge 20c. In particular, the saw teeth 16c each have two cutting surfaces 40c, 41c, 114c. Preferably, each cutting surface 40c, 41c, 114c of the saw teeth 16c of the saw blade 10c is formed at least largely, in particular, at least substantially entirely, by one of the inserts 14c. In FIG. 10, the circular basic shape of insert blanks 94c from which the inserts 14c and/or saw teeth 16c have been formed is illustrated. The cutting surfaces 40c, 41c, 114c of the saw teeth 16c are, in particular, formed straight. The tooth bottoms 62c of the saw teeth 16c are, in particular, formed circular.

Figure 11:
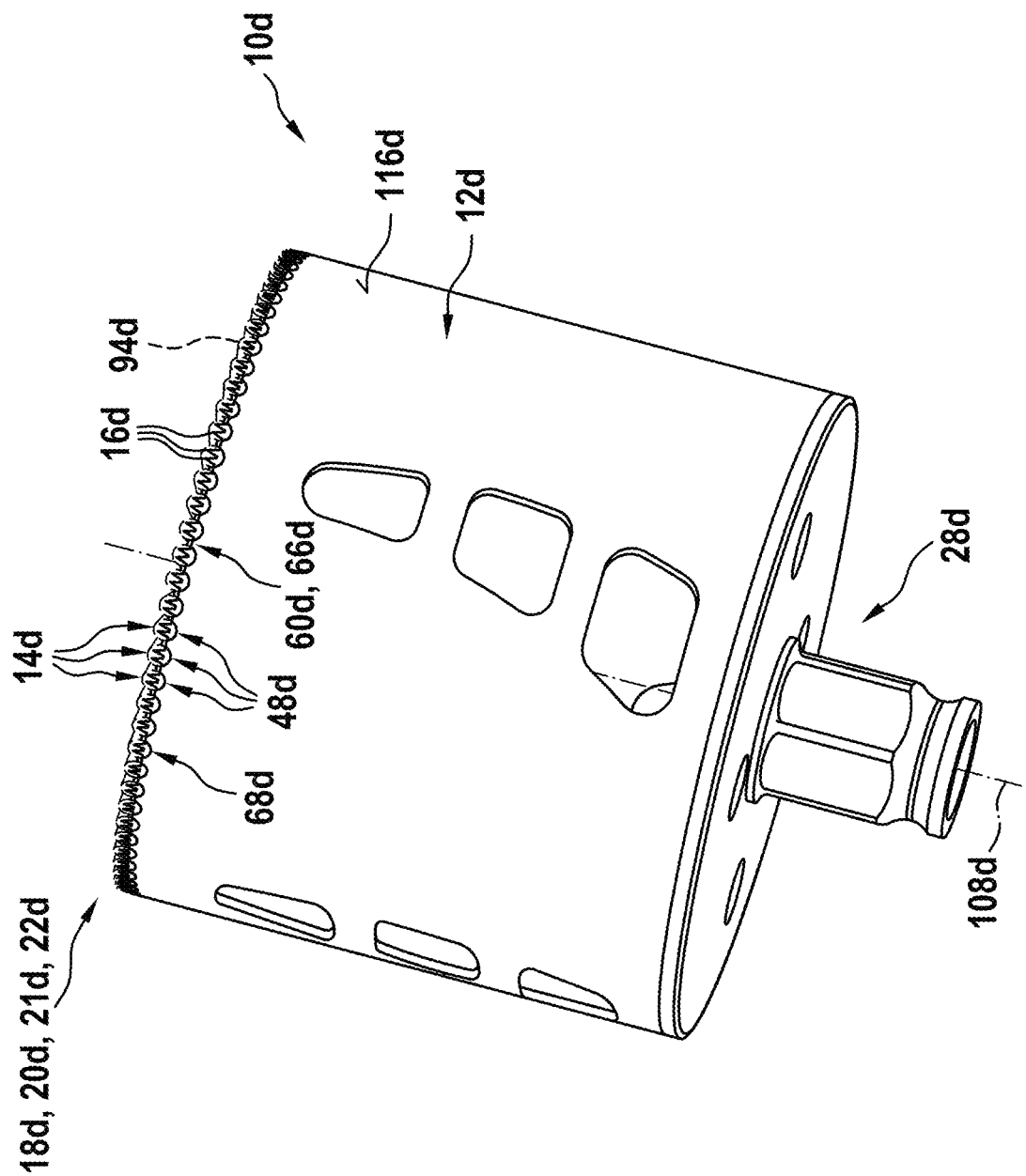

FIG. 11 shows a further alternative configuration of a saw blade 10d. The saw blade 10d comprises a carrier part 12d comprising at least one cutting side 22d and a plurality of mutually spaced inserts 14d, wherein the inserts 14d are formed of a material, in particular, a carbide, which has a greater hardness than a material of the carrier part 12d, wherein the inserts 14d are each fastened to the at least one cutting side 22d of the carrier part 12d. The inserts 14d each at least partially form two saw teeth 16d. The saw blade 10b shown in FIG. 11 has a design at least substantially analogous to the saw blade 10a described in relation to FIGS. 1 to 4, so that with respect to a design of the saw blade 10b shown in FIG. 11, reference can be made at least substantially to the description relating to FIGS. 1 to 4. In contrast to the saw blade 10*a* described in relation to FIGS. 1 to 4, the saw blade 10*d* shown in FIG. 11 preferably has a circular cut edge 20*d*. The saw blade 10*d* is configured, in particular as a hole saw blade. The saw blade 10*d* is provided, in particular for a sawing operation, to be moved about a drive axis 108*d* oriented at least substantially parallel to an outer surface 116*d* of the carrier part 12*d*. The carrier part 12*d* has a cylindrical shell-like basic shape. In particular, viewed along the drive axis 108*d*, the cutting side 22*d* has a circular basic shape. The inserts 14*d* are arranged along a circular line on the carrier part 12*d*, in particular on the cutting side 22*d*. FIG. 11 shows the inserts 14*d* schematically in a circular basic shape of insert blanks 94*d*. All designs of the saw teeth 16*d* known to a person skilled in the art are conceivable. The saw blade 10*d* comprises a connection region 28*d* which is connected to the carrier part 12*d* in an integrally bonding manner. However, other configurations of the saw blade 10*d*, in particular the connection region 28*d* and/or the carrier part 12*d*, are also conceivable.

Figure 12:
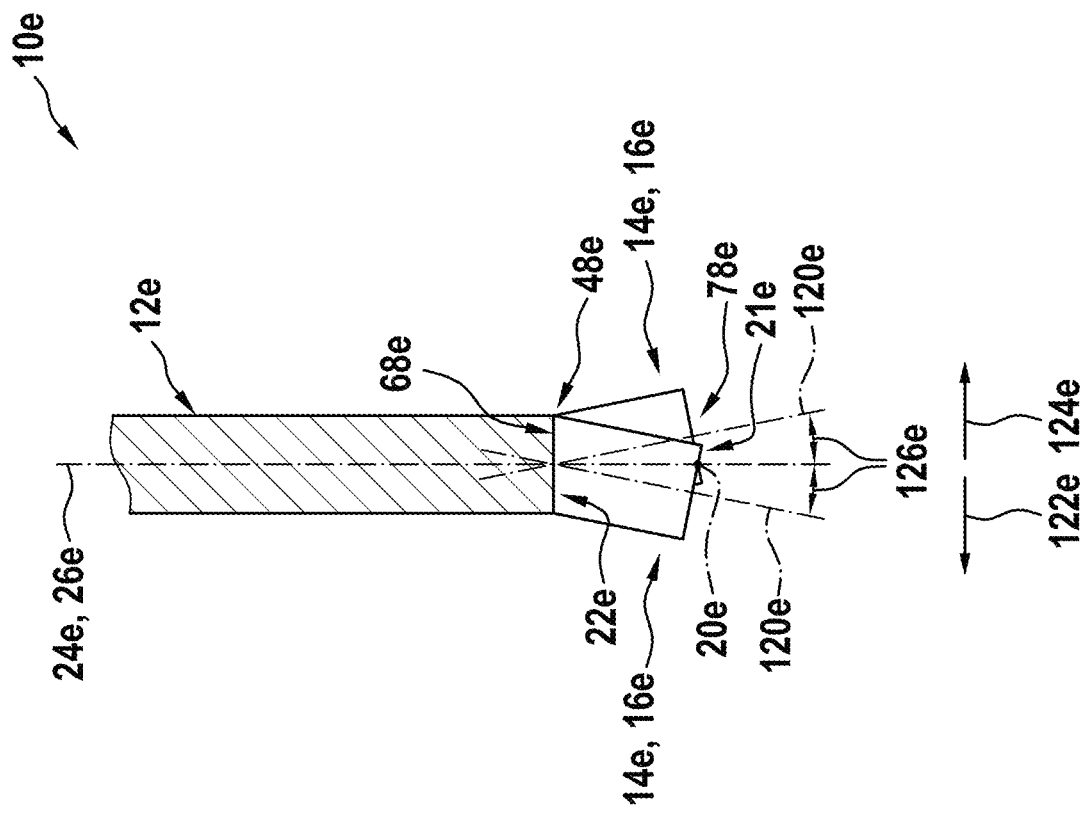

FIG. 12 shows another alternative design of a saw blade 10*e* in a sectional view, viewed along a cut edge 20*e* of the saw blade 10*e*. The saw blade 10*e* in FIG. 12 is shown only in a region of the cut edge 20*e*. The saw blade 10*e* comprises a carrier part 12*e* having at least one cutting side 22*e*, and a plurality of mutually spaced inserts 14*e*, wherein the inserts 14*e* are formed from a material, in particular a carbide, which has a greater hardness than a material of the carrier part 12*e*, wherein the inserts 14*e* are each fastened to the at least one cutting side 22*e* of the carrier part 12*e*. The inserts 14*e* each at least partially form two saw teeth 16*e*. The saw blade 10*b* shown in FIG. 12 has a design at least substantially analogous to the saw blade 10*a* described in relation to FIGS. 1 to 4, so that, with respect to a design of the saw blade 10*b* shown in FIG. 12, reference can be made at least substantially to the description in relation to FIGS. 1 to 4. In contrast to the saw blade 10*a* described in relation to FIGS. 1 to 4, the saw blade 10*e* shown in FIG. 12 preferably comprises a clearance 78*e*, which is configured by way of a cross-set of the saw teeth 16*e*. The inserts 14*e* are fastened to the carrier part 12*e* such that the inserts 14*e* are arranged inclined relative to a main extension plane 26*e* of the carrier part 12*e*. In particular, a main extension plane 120*e* of the inserts 14*e* and/or the saw teeth 16*e* are each arranged inclined relative to the main extension plane 26*e* of the carrier part 12*e*. Viewed along the cut edge 20*e*, the saw teeth 16*e* are inclined alternately in two different, in particular opposite, directions 122*e*, 124*e* that are perpendicular to the main extension plane 26*e* of the carrier part 12*e*. In particular, an angle 126*e* between the inserts 14*e*, in particular, between the main extension plane 120*e* of the inserts 14*e* and/or the saw teeth 16*e*, and the main extension plane 26*e* of the carrier part 12*e*, is in each case at least substantially 15°. In particular, the inserts 14*e*, in particular, insert blanks for the production of the inserts 14*e* (not shown in FIG. 12), each have, viewed along the cut edge 20*e*, a rectangular basic shape. However, other configurations of the clearance 78*e* of the saw blade 10*e*, in particular the clearance 78*e* of the saw teeth 16*e*, are conceivable, for example via an undulation of the saw teeth 16*e* or the like. Alternatively, it is conceivable that the insert blanks have a greater maximum width than the carrier part 12*e* and the clearance 78*e* is created by forming the saw teeth 16*e* by a removal of material.

The invention claimed is:

1. A saw blade, comprising:
   at least one carrier part that has at least one cutting side; and
   a multiplicity of inserts arranged so as to be spaced apart from one another,
   wherein the inserts are made from a material which is harder than a material of the carrier part,
   wherein the inserts are each fastened to the at least one cutting side of the carrier part by both a material connection and a positive-locking connection,
   wherein the inserts each at least partially form at least two saw teeth, and
   wherein each of the at least two saw teeth includes a flank surface and a tooth bottom, and the carrier part and/or a brazing or weld melt forms at least a portion of the tooth bottom and/or the flank surface of one of the at least two saw teeth.

2. The saw blade according to claim 1, wherein the inserts each at least partially form cutting surfaces and partially form the flank surfaces of the at least two saw teeth.

3. The saw blade according to claim 1, wherein each of the inserts forms the entirety of cutting surfaces of the at least two saw teeth.

4. The saw blade according to claim 1, wherein:
   the carrier part has a plurality of fastening receptacles along the at least one cutting side, and
   each of the inserts is connected to the carrier part in a respective one of the plurality of fastening receptacles.

5. The saw blade according to claim 1, further comprising:
   a plurality of saw teeth, which includes the at least two saw teeth of each of the multiplicity of inserts,
   wherein the portion of the tooth bottom and/or the flank surface that are formed by the carrier part and/or the brazing or weld melt is arranged between adjacent inserts.

6. The saw blade according to claim 1, wherein the inserts are mutually spaced by intermediate regions formed by the carrier part, said intermediate regions being arranged, viewed at least substantially perpendicularly to a cut edge of the saw blade, between the inserts.

7. The saw blade according to claim 1, wherein, on a side facing toward the carrier part, the inserts have an at least substantially round cross-section.

8. The saw blade according to claim 7, wherein the the at least substantially round cross-section is circularly arcuate.

9. The saw blade according to claim 1, further comprising at least one cut edge, wherein a tooth density formed along the cut edge is of at least 12 teeth per inch (TPI).

10. The saw blade according to claim 1, wherein all the saw teeth of the saw blade are each formed, at least partially, from one of the inserts.

11. A saw blade blank for producing a saw blade according to claim 1, including at least one carrier part blank which has at least one cutting side, and further including a plurality of insert blanks arranged mutually spaced on the carrier part blank, wherein the insert blanks are formed from a material which has a greater hardness than a material of the carrier part blank, and wherein the insert blanks are each provided to form, at least partially, at least two saw teeth.

12. A carrier part blank for producing a saw blade according to claim 1, including at least one base body which on at least one side forms a plurality of fastening receptacles configured to receive inserts, wherein a ratio of a number of saw teeth to be formed on the saw blade to a number of fastening receptacles is at least 2.

13. The saw blade according to claim 1, wherein the material which is harder than the material of the carrier part is a carbide.

14. The saw blade according to claim 1, wherein the inserts each form the entirety of cutting surfaces of each of the at least two saw teeth and the entirety of the flank surface of one of the at least two saw teeth, and at least partially form the flank surface of another one of the at least two saw teeth.

15. The saw blade according to claim 1, wherein all the saw teeth of the saw blade are each formed, at least partially, from half as many inserts as there are saw teeth formed.

16. The saw blade according to claim 1, wherein the at least the portion of the tooth bottom and/or the flank surface of the one of the at least two saw teeth that is formed by the carrier part and/or the brazing or weld melt forms a continuous tooth profile with adjacent portions of the insert.

17. A method for producing a saw blade, comprising:
arranging a plurality of insert blanks so as to be mutually spaced on at least one cutting side of at least one carrier part blank, wherein the insert blanks are made of a material which has a greater hardness than a material of the carrier part blank;
fastening the plurality of insert blanks to the at least one carrier part blank; and
forming at least two saw teeth, at least partially, on each of the insert blanks such that each of the at least two saw teeth includes a flank surface and a tooth bottom, and the carrier part blank and/or a brazing or weld melt forms at least a portion of the tooth bottom and/or the flank surface of one of the at least two saw teeth.

18. The method according to claim 17, wherein the insert blanks each have a basic shape which is substantially round on a side that is fastened on the carrier part blank.

19. The method according to claim 17, further comprising:
prior to arranging the insert blanks on the carrier part blank, introducing at least one positive-locking cut-out in the carrier part blank; and
the fastening of the plurality of insert blanks includes at least substantially covering the positive-locking cut-out from a direction at least substantially perpendicular to a main extension plane of the saw blade so as to form a positive-locking connection between one of the insert blanks and the carrier part blank.

20. The method according to claim 17, wherein the forming of the at least two saw teeth includes forming the at least the portion of the tooth bottom and/or the flank surface of the one of the at least two saw teeth that is formed by the carrier part blank and/or the brazing or weld melt to have a continuous tooth profile with adjacent portions of the insert blanks.

* * * * *